US011636100B2

(12) United States Patent
Shin et al.

(10) Patent No.: US 11,636,100 B2
(45) Date of Patent: Apr. 25, 2023

(54) SYSTEMS AND METHODS FOR COMPRESSION-BASED SEARCH ENGINE

(71) Applicant: Verizon Patent and Licensing Inc., Basking Ridge, NJ (US)

(72) Inventors: Herbert Shin, Fairview, NJ (US); Jose A. Ocasio Serra, Riverview, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 17/106,003

(22) Filed: Nov. 27, 2020

(65) Prior Publication Data

US 2022/0171769 A1 Jun. 2, 2022

(51) Int. Cl.
*G06F 16/215* (2019.01)
*G06F 16/242* (2019.01)

(52) U.S. Cl.
CPC ........ *G06F 16/2425* (2019.01); *G06F 16/215* (2019.01)

(58) Field of Classification Search
CPC .................. H03M 7/30; G06F 16/1744; G06F 16/90344; G06F 16/953; G06F 16/583; G06F 16/2455; G06F 16/903; G06F 16/248; G06F 16/174; G06F 16/9538; G06F 16/33; Y10S 707/99932; Y10S 707/99936; Y10S 707/99942
USPC .............. 707/692, 693, 722, 745, 758, 763, 707/E17.039, E17.051, E17.124, E17.125
See application file for complete search history.

(56) References Cited

U.S. PATENT DOCUMENTS

| | | | | |
|---|---|---|---|---|
| 4,868,570 A | * | 9/1989 | Davis ...................... | H03M 7/42 341/106 |
| 5,058,144 A | * | 10/1991 | Fiala .................... | H03M 7/3084 375/240 |
| 5,153,591 A | * | 10/1992 | Clark ...................... | G06T 9/005 341/51 |
| 5,737,733 A | * | 4/1998 | Eller ....................... | H03M 7/30 707/708 |
| 5,765,150 A | * | 6/1998 | Burrows ................ | G06F 16/319 707/999.005 |
| 6,269,189 B1 | | 7/2001 | Chanod | |
| 6,334,123 B1 | * | 12/2001 | Ross .................... | G06F 16/2237 707/999.102 |
| 6,684,201 B1 | | 1/2004 | Brill | |
| 6,741,985 B2 | * | 5/2004 | Green ................... | G06F 16/313 707/E17.084 |
| 6,785,677 B1 | | 8/2004 | Fritchman | |
| 7,860,849 B1 | * | 12/2010 | Venkatachary ... | G06F 16/90344 707/758 |
| 7,917,486 B1 | * | 3/2011 | Gupta ................ | G06F 16/90344 707/758 |
| 9,268,749 B2 | * | 2/2016 | Tealdi ...................... | G06F 40/12 |
| 10,311,034 B2 | * | 6/2019 | Kataoka ............... | G06F 16/3334 |

(Continued)

*Primary Examiner* — Alex Gofman
*Assistant Examiner* — Linh Black

(57) ABSTRACT

A system described herein may provide a technique for the compression of query terms and search data against which the query terms may be evaluated. The compression may be dynamic, in that a quantity of bits used to compress the search data and query terms may be based on a quantity of unique characters included in a given query term. The compression may further include reducing the volume of search data by compressing entire words, that do not include any of the unique characters of the query term, to one particular code.

20 Claims, 17 Drawing Sheets

(56) References Cited

U.S. PATENT DOCUMENTS

| | | | |
|---|---|---|---|
| 11,244,008 B1* | 2/2022 | McCoy | G06F 16/955 |
| 2003/0137438 A1* | 7/2003 | Yokose | H03M 7/48 |
| | | | 341/106 |
| 2006/0230162 A1* | 10/2006 | Chen | H04L 65/70 |
| | | | 375/E7.091 |
| 2008/0228748 A1* | 9/2008 | Fairweather | G06F 16/31 |
| 2009/0063825 A1* | 3/2009 | McMillen | G06F 9/4498 |
| | | | 712/220 |
| 2011/0161357 A1* | 6/2011 | Kataoka | H03M 7/40 |
| | | | 707/769 |
| 2011/0208707 A1 | 8/2011 | Monga et al. | |
| 2014/0201224 A1 | 7/2014 | Schwarz | |
| 2018/0204111 A1* | 7/2018 | Zadeh | G06N 3/0436 |
| 2019/0163817 A1* | 5/2019 | Milenova | G06F 16/353 |
| 2020/0210426 A1* | 7/2020 | Araki | G06F 16/248 |
| 2021/0103256 A1* | 4/2021 | Jia | G06K 9/6232 |
| 2021/0104234 A1* | 4/2021 | Zhang | G10L 15/063 |
| 2021/0141801 A1* | 5/2021 | Teague | G06F 16/258 |

\* cited by examiner

SYSTEMS AND METHODS FOR COMPRESSION-BASED SEARCH ENGINE

BACKGROUND

Search engines allow for the evaluation of query strings to search data such as webpages, text documents, or the like. Query strings and/or the search data may include misspellings, varying tenses, varying declensions, and/or other variations.

DETAILED DESCRIPTION OF EXAMPLE EMBODIMENTS

Figure 1:
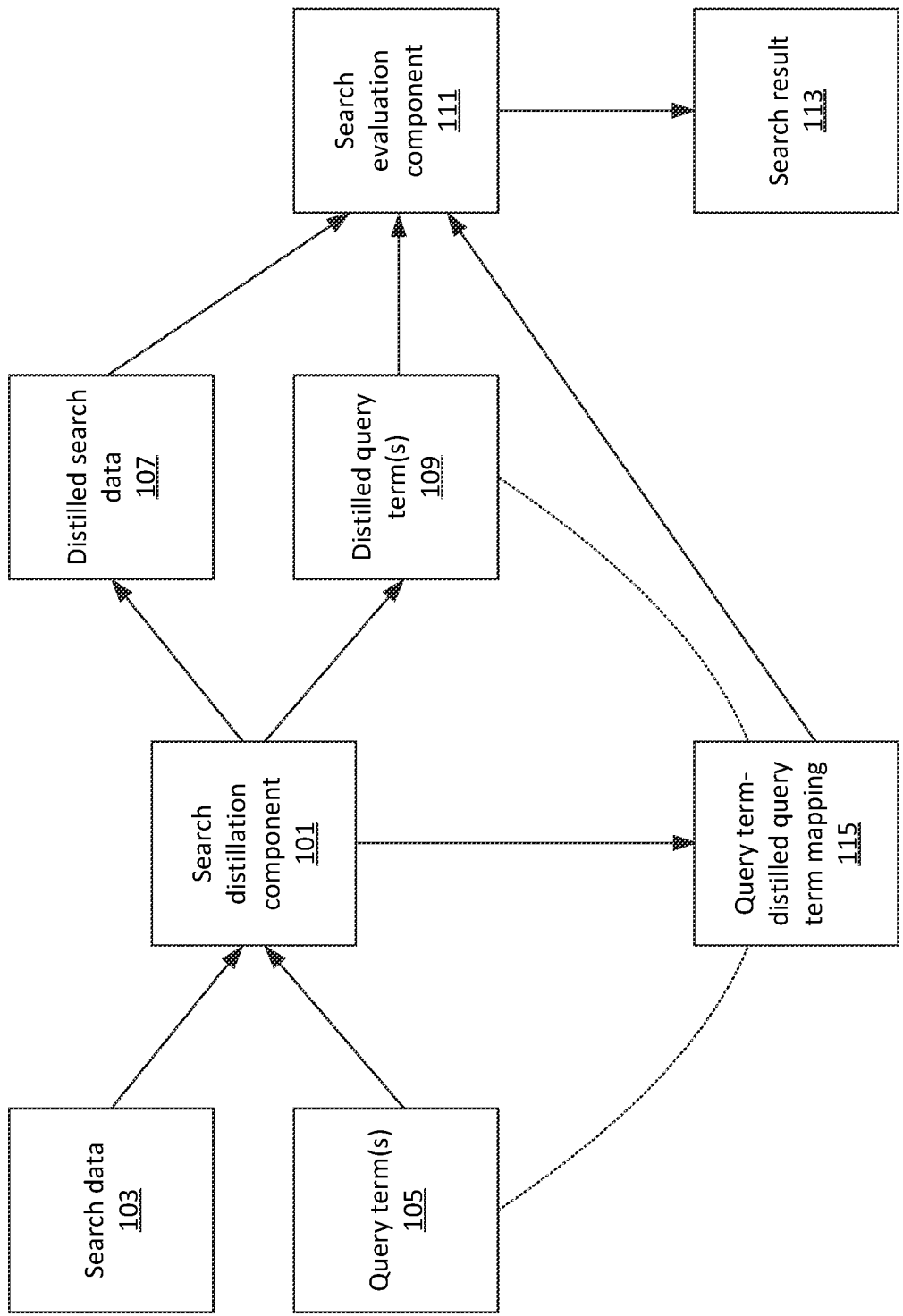
FIG. 1 illustrates an example overview of one or more embodiments described herein, in which one or more query terms and search data may be distilled in order to efficiently evaluate whether the search data includes one or more query terms, in accordance with some embodiments.

The following detailed description refers to the accompanying drawings. The same reference numbers in different drawings may identify the same or similar elements. Embodiments described herein provide for a compression-based evaluation of search data, such as one or more webpages, text documents, logs, books, and/or other suitable data, to determine the presence of one or more query strings in the search data. The compression-based techniques used herein may result in a faster and less resource-intensive identification of query strings in search data than approaches that do not use such compression-based techniques.

For example, one such approach that does not use such compression-based techniques may include a simple pattern matching technique, in which search data is parsed to determine whether the search data includes a literal match of a query string. For example, for the example query string "test query" and the example search data "This is search data for test queries," a simple pattern matching technique may result in a negative result (e.g., no matches found), as the literal string "test query" is not present in the search data.

One additional approach may include mapping the query string to additional alternate query strings based on one or more rules and/or static mapping techniques. For example, such an approach may include mapping the example search query "test query" to a set of query strings such as "test queries," "tests query," "tests queries," "test querys," and/or other query strings that are based on the initial query string. For example, such mapping may be based on rules, mappings, etc. that are based on the various forms, misspellings, variations, etc., of "test" and/or "query" that may be determined. In this example, five query strings (e.g., the initial query string and the four example additional query strings described above) may be evaluated against the search data in order to determine whether the search data includes any of the five query strings. Such evaluation may consume five times the time and/or processing resources as performing a single evaluation of the original query string alone against the search data. Further, situations may arise where such rules, mapping, etc. do not capture certain variations on the query string which may be present in the search data, thereby reducing fidelity or accuracy of such pattern matching evaluation.

In accordance with embodiments herein, query strings and search data may be "distilled," and distilled query strings may be evaluated against distilled search data in order to identify the presence of query strings and/or query terms that include query strings. As referred to herein, "distilled" data (e.g., search data, query terms, etc.) may be data that is sanitized, corrected, lemmatized, and/or compressed according to one or more embodiments. Such sanitization, correction, lemmatization, and/or compression operations are described in more detail below. Briefly, distilled data may include base words of a set of words. As referred to herein, a "base" word may be a component or form of a word that corresponds to a particular tense, declension, quantity (e.g., a singular form of a word as opposed to a plural form of the word), etc. For example, a "base" word of "queries" may be "query," a "base" word of "loved" may be "love," and so on. As some embodiments described herein use "base" words for evaluation rather than attempting to expand words (e.g., based on rules, mappings, etc., as discussed above), such embodiments may avoid the consumption of resources (e.g., time, processing resources, and/or other resources) that would be consumed by generating and/or evaluating such expanded words.

In some embodiments, the distilled data may include a set of characters that are encoded in a reduced encoding space as compared to a "standard" encoding space. For example, distilled data may include characters encoded in a 3-bit, 4-bit, etc., encoding space which is a reduced encoding space compared to an 8-bit encoding space associated with American Standard Code for Information Interchange ("ASCII") encoding and/or some other type of encoding space in which characters of the query string and/or search data are encoded. The encoding of the query strings and/or search data in the reduced encoding space may provide for a more efficient evaluation of the query strings against the search data. For example, if distilled data is reduced to a 4-bit encoding space from an 8-bit encoding space, a consumption of time and/or processing resources for an evaluation (e.g., bitwise comparison) of the query strings against the search data may be reduced by approximately half and/or by some other amount (e.g., where the actual amount of reduction may be affected by factors such as processor speed and/or available processing resources, particular algorithm(s) used for the evaluation, etc.).

As shown in FIG. 1, for example, Search Distillation Component ("SDC") 101 may receive search data 103 and query term(s) 105. Search data 103 may be or may include, textual data, linguistic data, etc. For example, search data 103 may be, may include, may be associated with, etc. one or more web pages, text documents, chat logs, wireless network performance data logs, books, encoded content (e.g., images, audio data, etc. encoded in textual format) and/or other content. Query term(s) 105 may include one or more terms, strings, etc., where such terms, strings, etc. are to be located or identified in search data 103. For example, query term(s) 105 may be received from a User Equipment ("UE") such as a smart phone, a tablet, a laptop computer, a workstation, and/or some other suitable type of device or system. Query term(s) 105 may be received via a text input element of a graphical user interface ("GUI"), such as a text box or text field, via an audible input (e.g., a virtual assistant or other type of audible interface), etc. For example, query term(s) 105 may be received via a text input element associated with a search engine.

As used herein, a "query term" may include one or more query strings and one or more conditional operators or other information that defines search parameters for the query strings. For example, a "query string" may include words, strings, etc. to be searched, while a "query term" may include multiple query strings with logical and/or conditional operators such as "AND", "OR", "NOT", "&", quotation marks, and/or other suitable operators. Thus, in some situations, a "query term" may include only one "query string," while in other situations, a "query term" may include multiple query strings and one or more logical and/or conditional operators.

As shown, based on the received search data 103 and query term(s) 105, SDC 101 may generate distilled search data 107 and distilled query term(s) 109. The distillation (e.g., sanitization, correction, lemmatization, compression, and/or other suitable modification or processing) of search data 103 and query term(s) 105, to generate distilled search data 107 and distilled query term(s) 109, is described in greater detail below. For example, as discussed below, such operations may include a compression of search data 103 and/or query term(s) 105 into a reduced encoding space as compared to an original encoding space of search data 103 and query term(s) 105. For example, search data 103 and query term(s) 105 may be represented by eight-bit characters using an ASCII encoding scheme, a Unicode Transformation Format—8-bit ("UTF-8) encoding scheme, etc. Distilled search data 107 and/or distilled query term(s) 109 may be compressed and encoded in an encoding space that consumes fewer than eight bits per character in accordance with embodiments described below. In accordance with embodiments described herein, the encoding space may be dynamically determined based on the characters included in query term(s) 105.

Search Evaluation Component ("SEC") 111 may evaluate distilled search data 107 to determine the presence of distilled query term(s) 109 in distilled search data 107, and may generate search result 113. Search result 113 may indicate whether particular distilled query terms 109 (or portions thereof, such as distilled query strings) were found in distilled search data 107, which may further indicate that one or more query terms 105 were found in search data 103. For example, one or more variations of query terms 105 may be found in search data 103.

In some embodiments, SDC 101 may further generate mapping 115, which may correlate original query terms 105 to distilled query terms 109. In some embodiments, SEC 111 may further evaluate mapping 115 against distilled search data 107 and/or search data 103 in order to determine a measure of closeness of between one or more search results 113 and the original query term(s) 105, to rank search results 113, and/or perform other suitable operations. For example, search result 113 may include multiple instances of the same distilled query term(s) 109 (e.g., as determined based on distilled search data 107), but the literal query term(s) 105 may be a closer match to certain instances of terms present in search data 103. In some embodiments, SDC 101 may further generate a mapping of original words, strings, etc. of search data 103 to distilled words, strings, etc. of distilled search data 107.

For example, in accordance with embodiments described herein, assume that search data 103 includes the phrase (bolded for emphasis for the purposes of this explanation): "This is search data for test queries, and a test query can be evaluated against this search data". Further assume that query term(s) 105 includes the phrase "test queries". Distilled query term(s) 109 may include the phrase "test query", and search result 113 may indicate that "test query" was found twice in distilled search data 107 (e.g., where "test queries" in search data 103 may be distilled to "test query", resulting in two matches for "test query" in distilled search data 107). SEC 111 may utilize mapping 115 to determine that the first instance of "test query" in distilled search data 107 was generated based on the phrase "test queries" from search data 103, and may identify that the phrase "test queries" from search data 103 is a closer match to query term(s) 105 (i.e., "test queries") than the phrase "test query" from search data 103. SEC 111 may, in some embodiments, rank search result 113 and/or otherwise indicate that the instance of the phrase "test queries" from search data 103 is a closer match to query term(s) 105 than the instance of the phrase "test query" from search data 103.

Figure 2:
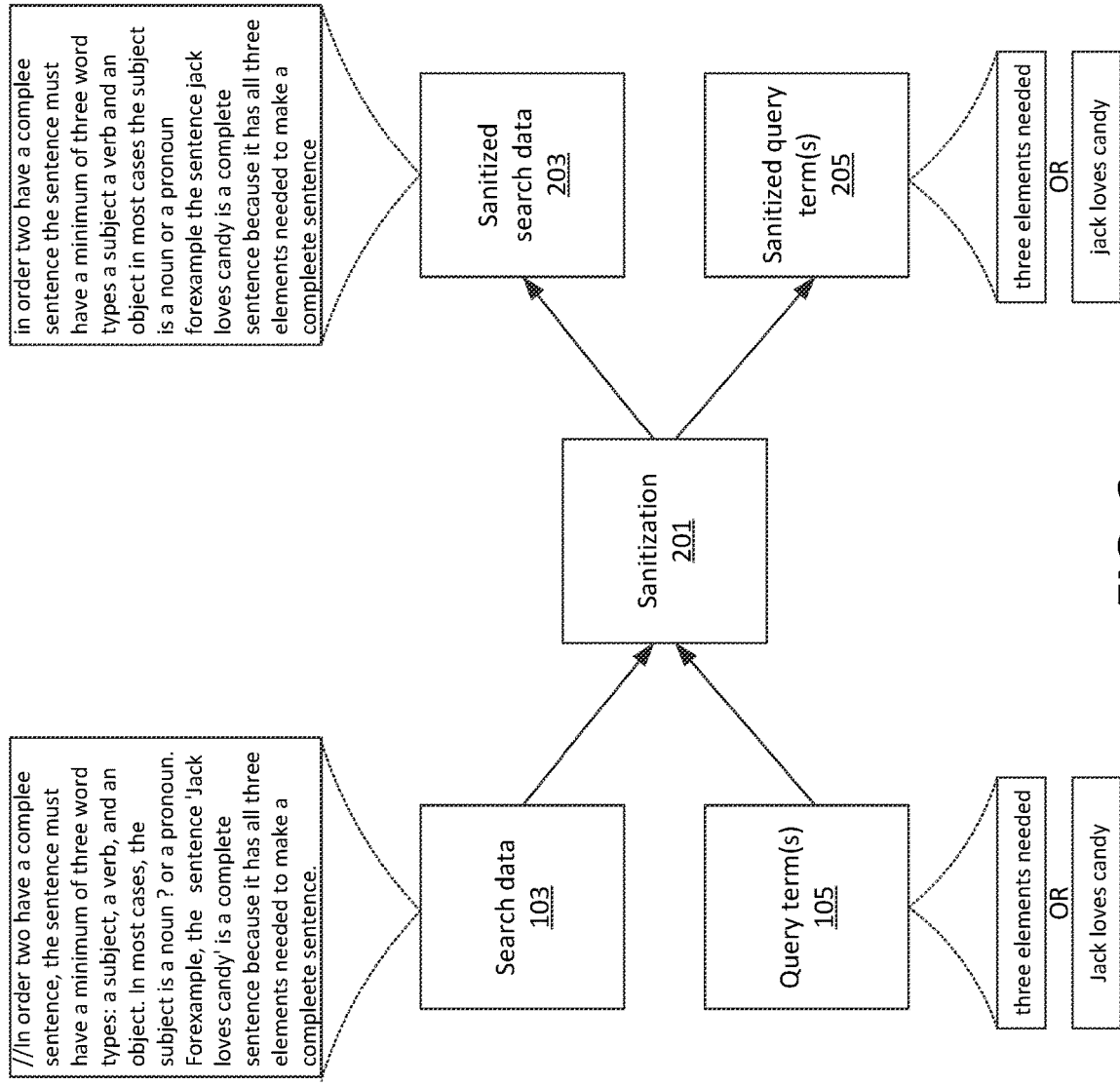
FIG. 2 illustrates an example sanitization operation that may be performed on one or more query terms and/or search data, in accordance with some embodiments.

FIG. 2 illustrates an example sanitization operation 201 that may be performed in accordance with some embodiments. As noted above, the distillation of search data 103 and/or query term(s) 105 (e.g., by SDC 101) may include sanitization operation 201 and/or one or more other suitable operations.

In this example, search data 103 may include the example paragraph (spelling errors and errant punctuation intentional), as produced in Table 1:

TABLE 1

//In order two have a complee sentence, the sentence must
have a minimum of three word types: a
subject, a verb, and an object. In most cases, the subject
is a noun ? or a pronoun. Forexample, the
sentence 'Jack loves candy' is a complete sentence because it has
all three elements needed to make a compleete sentence.

Further, in this example, query term(s) 105 may include the strings "three elements needed" and "Jack loves candy", with an OR conditional operator. For example, the objective of query term(s) 105 may be to locate the string "three elements needed" and/or the string "Jack loves candy" in search data 103 (e.g., in the paragraph reproduced above).

Sanitization operation 201 may include setting all letters to one case (e.g., replacing uppercase characters with lowercase characters, or replacing all lowercase characters with uppercase characters), eliminating non-alphabetic characters (e.g., punctuation, numbers, or the like), normalizing white space (e.g., replacing multiple spaces between words, such as the triple space between "the" and "sentence" in search data 103, with a single space), and/or other suitable operations. For example, SDC 101 may generate sanitized search data 203 based on sanitization operation 201.

As shown, sanitized search data 203 may be a sanitized version of search data 103, and may include the following phrase, as produced in Table 2 (spelling errors intentional):

TABLE 2 in order two have a complee sentence the sentence
must have a minimum of three word types a
subject a verb and an object in most cases the subject
is a noun or a pronoun forexample the sentence
jack loves candy is a complete sentence because it has all three
elements needed to make a compleete sentence Further, sanitized query term(s) 205 may include the strings "three elements needed" and "jack loves candy" separated by the OR operator.

Figure 3:
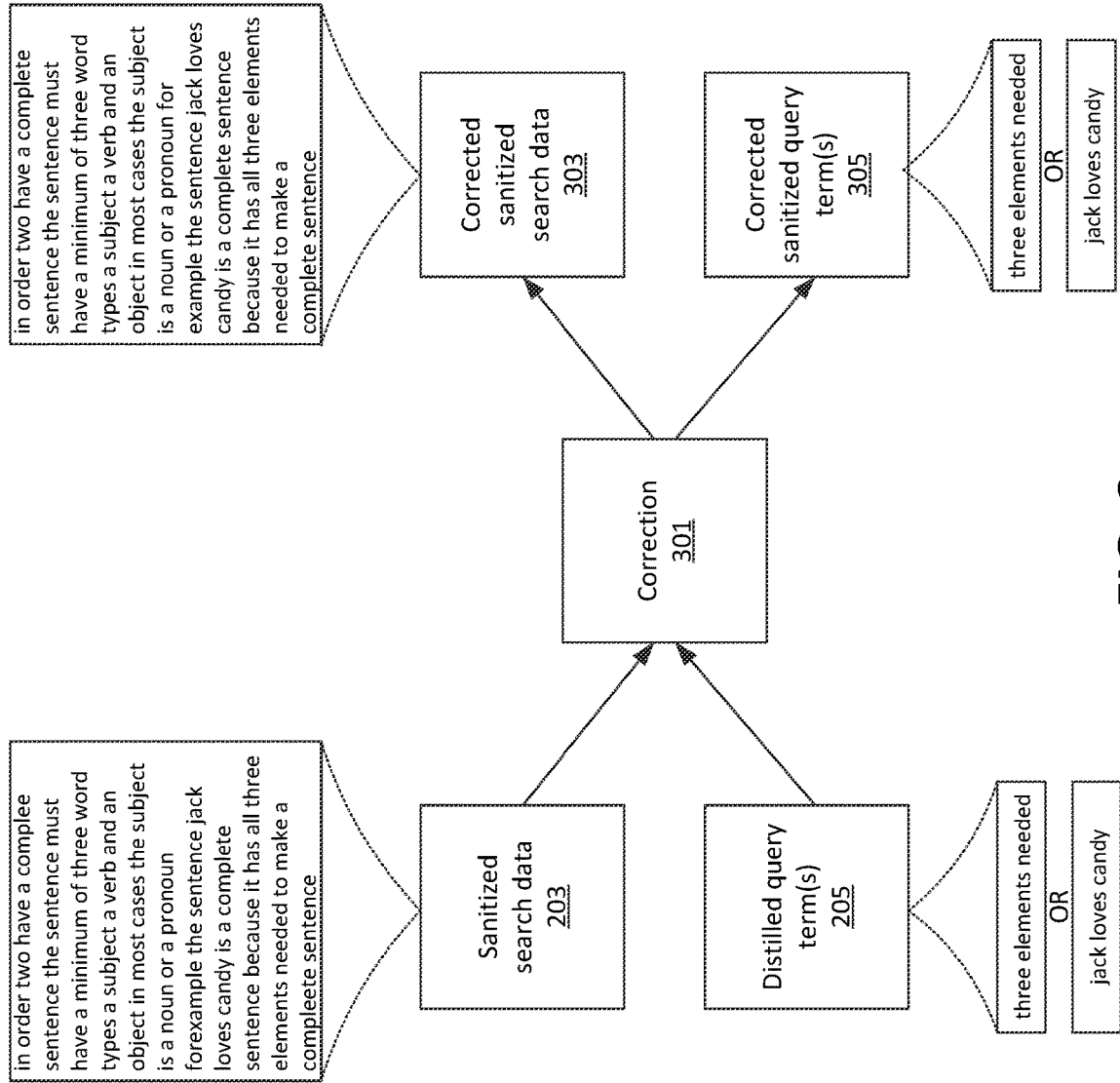
FIG. 3 illustrates an example correction operation that may be performed on a query term and/or search data, in accordance with some embodiments.

FIG. 3 illustrates an example correction operation 301 that may be performed in accordance with some embodiments. As noted above, the distillation of search data 103 and/or query term(s) 105 (e.g., by SDC 101) may include correction operation 301 and/or one or more other suitable operations. In some embodiments, SDC 101 may perform correction operation 301 on sanitized search data 203 and sanitized query term(s) 205. In some embodiments, SDC 101 may perform correction operation 301 on search data 103 and/or some other version of search data 103 (e.g., where such other version is generated based on one or more other operations in lieu of, or in addition to, sanitization operation 201). Similarly, in some embodiments, SDC 101 may perform correction operation 301 on query term(s) 105 and/or some other version of query term(s) 105.

As shown, for example, correction operation 301 may include correcting the spelling of misspelled words in sanitized search data 203 and/or sanitized query term(s) 205. In this example, correction operation 301 may include correcting the spelling of, for example, the misspelled words "complee", "forexample", and "compleete" in sanitized search data 203, to generate corrected sanitized search data 303. Further, in the example shown here, corrected sanitized query term(s) 305 may be the same as sanitized query term(s) 205, as there may be no corrections to be made to sanitized query term(s) 205.

Figure 4:
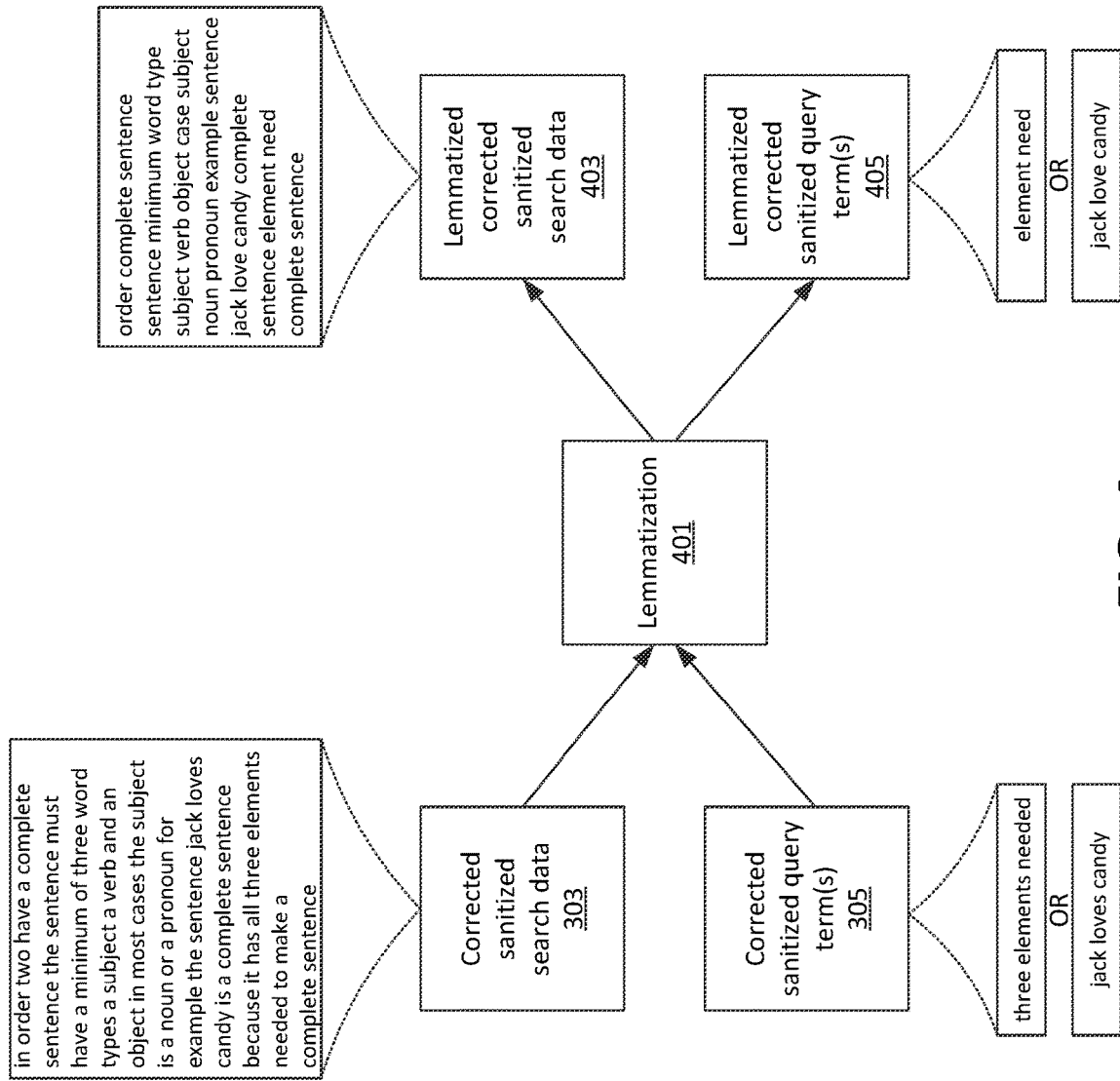
FIG. 4 illustrates an example lemmatization operation that may be performed on a query term and/or search data, in accordance with some embodiments.

FIG. 4 illustrates an example lemmatization operation 401 that may be performed in accordance with some embodiments. As noted above, the distillation of search data 103 and/or query term(s) 105 (e.g., by SDC 101) may include lemmatization operation 401 and/or one or more other suitable operations. In some embodiments, SDC 101 may perform lemmatization operation 401 on corrected sanitized search data 303 and corrected sanitized query term(s) 305. In some embodiments, SDC 101 may perform lemmatization operation 401 on search data 103, sanitized search data 203, and/or some other version of search data 103 (e.g., where such other version is generated based on one or more other operations in lieu of, or in addition to, sanitization operation 201 and/or correction operation 301). Similarly, in some embodiments, SDC 101 may perform lemmatization operation 401 on query term(s) 105, sanitized query term(s) 205, and/or some other version of query term(s) 105 (e.g., where such other version is generated based on one or more other operations in lieu of, or in addition to, sanitization operation 201 and/or correction operation 301).

Lemmatization operation 401 may include reducing words and/or phrases of corrected sanitized search data 303 and/or corrected sanitized query term(s) 305 to "base" words, or "lemmas." In some embodiments, as noted above, "base" words may be the singular form of a noun, a present tense case of a verb, an adjectival form of an adverb (e.g., "quickly" converted to "quick"), and/or other similar operations. In some embodiments, lemmatization operation 401 may include the removal of "stop" words, such as "and", "the", "or", and/or other words designated for removal by lemmatization operation 401. In some embodiments, lemmatization operation 401 may include the removal of words indicating numbers (e.g., "one", "two", "three", etc.).

Thus, in this example, lemmatized corrected sanitized search data 403 may include the following phrase, as produced in Table 3 (spelling errors intentional):

TABLE 3 order complete sentence sentence minimum word type
subject verb object case subject noun
pronoun example sentence jack love candy complete
sentence element need complete sentence"

Further, in this example, lemmatized corrected sanitized query term(s) 405 may include the phrases "element need" and "jack love candy", separated by the OR operator.

Figure 5:
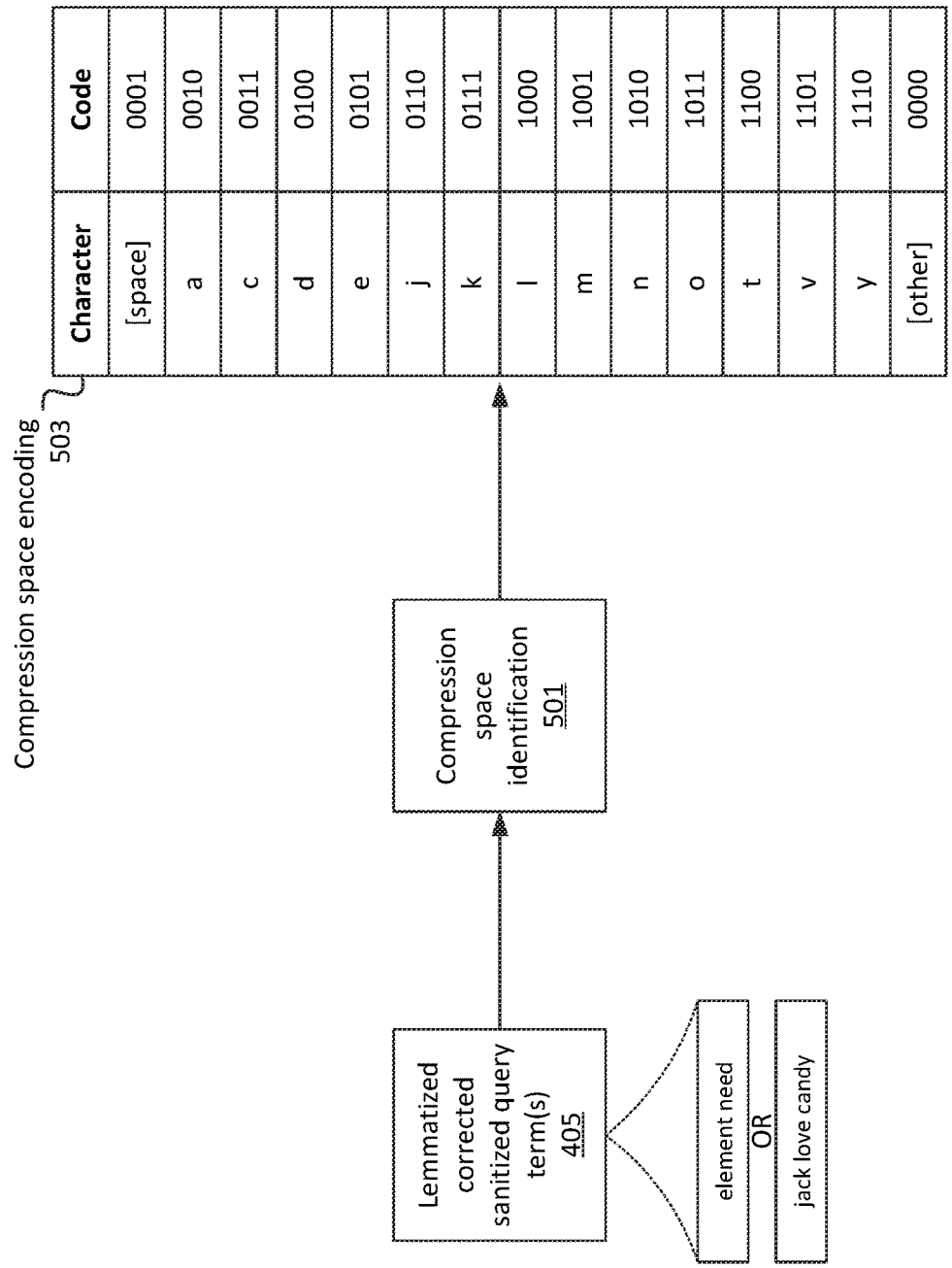
FIG. 5 illustrates an example compression space identification operation that may be performed on a query term and/or search data, in accordance with some embodiments.

FIG. 5 illustrates an example compression space identification operation 501 that may be performed in accordance with some embodiments. As noted above, the distillation of search data 103 and/or query term(s) 105 (e.g., by SDC 101) may include compression space identification operation 501 and/or one or more other suitable operations. In some embodiments, SDC 101 may perform compression space identification operation 501 on lemmatized corrected sanitized query term(s) 405. In some embodiments, SDC 101 may perform lemmatization operation 401 on search data 103, sanitized search data 203, corrected sanitized search data 303, and/or some other version of search data 103 (e.g., where such other version is generated based on one or more other operations in lieu of, or in addition to, sanitization operation 201, correction operation 301, and/or lemmatization operation 401).

Compression space identification operation 501 may include identifying all of the characters present in lemmatized corrected sanitized query term(s) 405. For example, SDC 101 may identify that lemmatized corrected sanitized query term(s) 405 include the characters "a", "c", "d", "e", "j", "k", "l", "m", "n", "o", "t", "v", and "y." Further, SDC 101 may identify that lemmatized corrected sanitized query term(s) 405 include a "space" character. As such, SDC 101 may identify that lemmatized corrected sanitized query term(s) 405 include 14 characters, including the "space" character. As such, compression space identification operation 501 may include identifying a quantity of bits that can represent the 14 characters, as well as a 15th value that represents "other" characters (e.g., other than the 14 characters included in lemmatized corrected sanitized query term(s) 405). In some embodiments, such identification of a quantity of bits may include performing a logarithm function, such as a base two logarithm function, on the identified quantity of characters (e.g., 15 characters in this example). The identification of the quantity of bits may further include performing a ceiling function on the result of the base two logarithm function (e.g., rounding up to the next whole number). In this example, log 2(15)=3.9, and the result of the ceiling function performed on the result (3.9) may be 4. Accordingly, the identified quantity of bits may be four, where each bit can represent two values (i.e., 0 or 1). For example, four bits are able to represent 16 values (i.e., $2^4$=16), while three bits would be insufficient to represent the 15 characters and/or values (i.e., $2^3$=8). As such, compression space identification operation 501 may include determining that lemmatized corrected sanitized query term(s) 405 should be compressed to a four-bit space.

For example, compression space identification operation 501 may generate compression space encoding 503, mapping each character of lemmatized corrected sanitized query term(s) 405, as well as the "other" value, to a respective code in the four-bit space. For example, "space" may be represented by 0001, "a" may be represented by 0010, "c" may be represented by 0011, and so on. Additionally, compression space encoding 503 may include the code 0000 for "other" characters.

Figure 6:
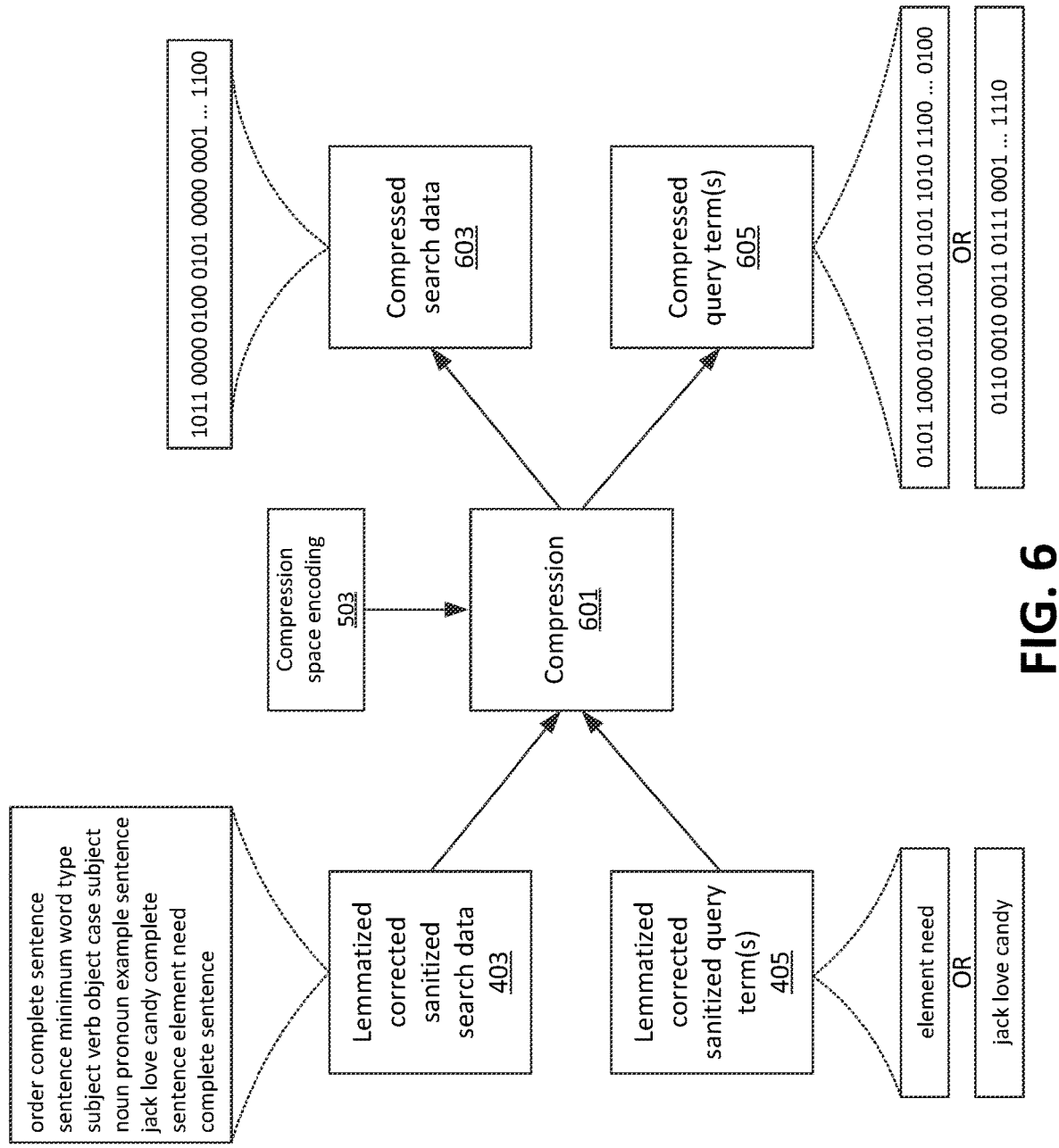
FIG. 6 illustrates an example compression operation that may be performed on a query term and/or search data, in accordance with some embodiments.

FIG. 6 illustrates an example compression operation 601 that may be performed in accordance with some embodiments. As noted above, the distillation of search data 103 and/or query term(s) 105 (e.g., by SDC 101) may include compression operation 601 and/or one or more other suitable operations. In some embodiments, SDC 101 may perform compression operation 601 on lemmatized corrected sanitized search data 403 and/or lemmatized corrected sanitized query term(s) 405. In some embodiments, SDC 101 may perform compression operation 601 on search data 103, sanitized search data 203, corrected sanitized search data 303, and/or some other version of search data 103 (e.g., where such other version is generated based on one or more other operations in lieu of, or in addition to, sanitization operation 201, correction operation 301, and/or lemmatization operation 401). Similarly, in some embodiments, SDC 101 may perform compression operation 601 on query term(s) 105, sanitized query term(s) 205, corrected sanitized query term(s) 305, and/or some other version of query term(s) 105.

For example, compression operation 601 may include mapping each character of lemmatized corrected sanitized search data 403 and lemmatized corrected sanitized query term(s) 405 to the codes generated by compression space identification operation 501 (e.g., based on compression space encoding 503). For example, the word "order" in lemmatized corrected sanitized search data 403 may be encoded and/or compressed as "1011 0000 0100 0101 0000", where "1011" corresponds to the "o" in "order," where "0000" corresponds to the "r" (e.g., as "r" is an "other" character in compression space encoding 503), and so on. In some embodiments, compression operation 601 may include condensing any word that includes the "0000" code to "0000" itself. For example, while the word "order" is shown as being compressed to "1011 0000 0100 0101 0000" in this example, in some embodiments, the word "order" may be compressed to "0000", as the encoded and/or compressed version of the word "order" includes one or more "0000" codes. Further, for the sake of clarity and brevity, FIG. 6 includes ellipses (". . . ") to denote additional codes that may be included in compressed search data 603 and compressed query term(s) 605 but which are not explicitly shown in the figure.

Figure 7:
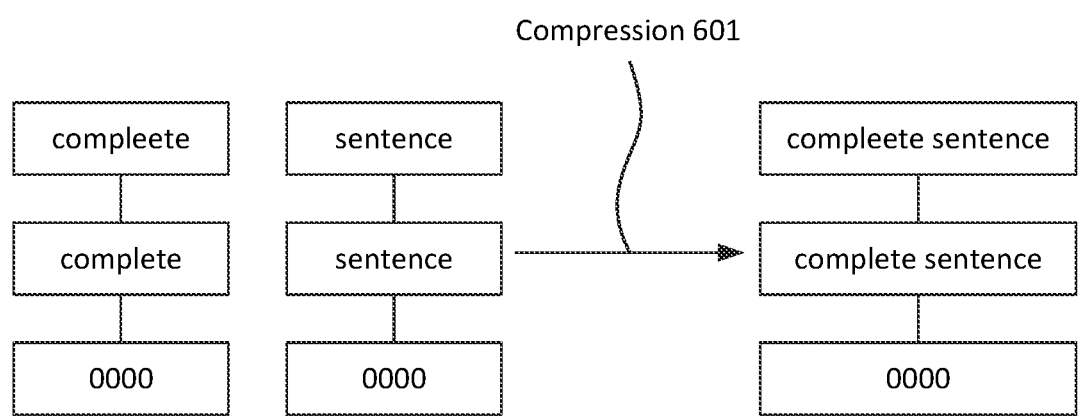
FIG. 7 illustrates an example of compressing multiple words, of search data, to a single code in accordance with one or more compression operations of some embodiments described herein.

FIG. 7 conceptually illustrates the compression of multiple words of lemmatized corrected sanitized search data 403 to a single code. For example, as shown, the words "complete" and "sentence" of lemmatized corrected sanitized search data 403 may each be represented by the code "0000", as neither one of these words is made up entirely of the characters of lemmatized corrected sanitized query term(s) 405. In other words, "complete" and "sentence" each include at least one of the characters represented by "[other]" in compression space encoding 503. Further, "complete" and "sentence" are not entirely made up of characters represented by codes, in compression space encoding 503, that represent characters that are present in lemmatized corrected sanitized query term(s) 405. As such, as "complete" and "sentence" are two consecutive words in lemmatized corrected sanitized search data 403 (e.g., two strings separated by a code associated with a "space" character) that include or are made up entirely of a "0000" code (representing "[other]" characters), these two consecutive words may be represented by a single "[other]" code (e.g., "0000" in this example). Such compression 601 of multiple words into a single "[other]" code may further enhance the speed and efficiency of an evaluation of compressed search data 603, as the evaluation of the single "[other]" code may consume less time and/or resources than evaluating multiple codes representing multiple characters or words.

Figure 8:
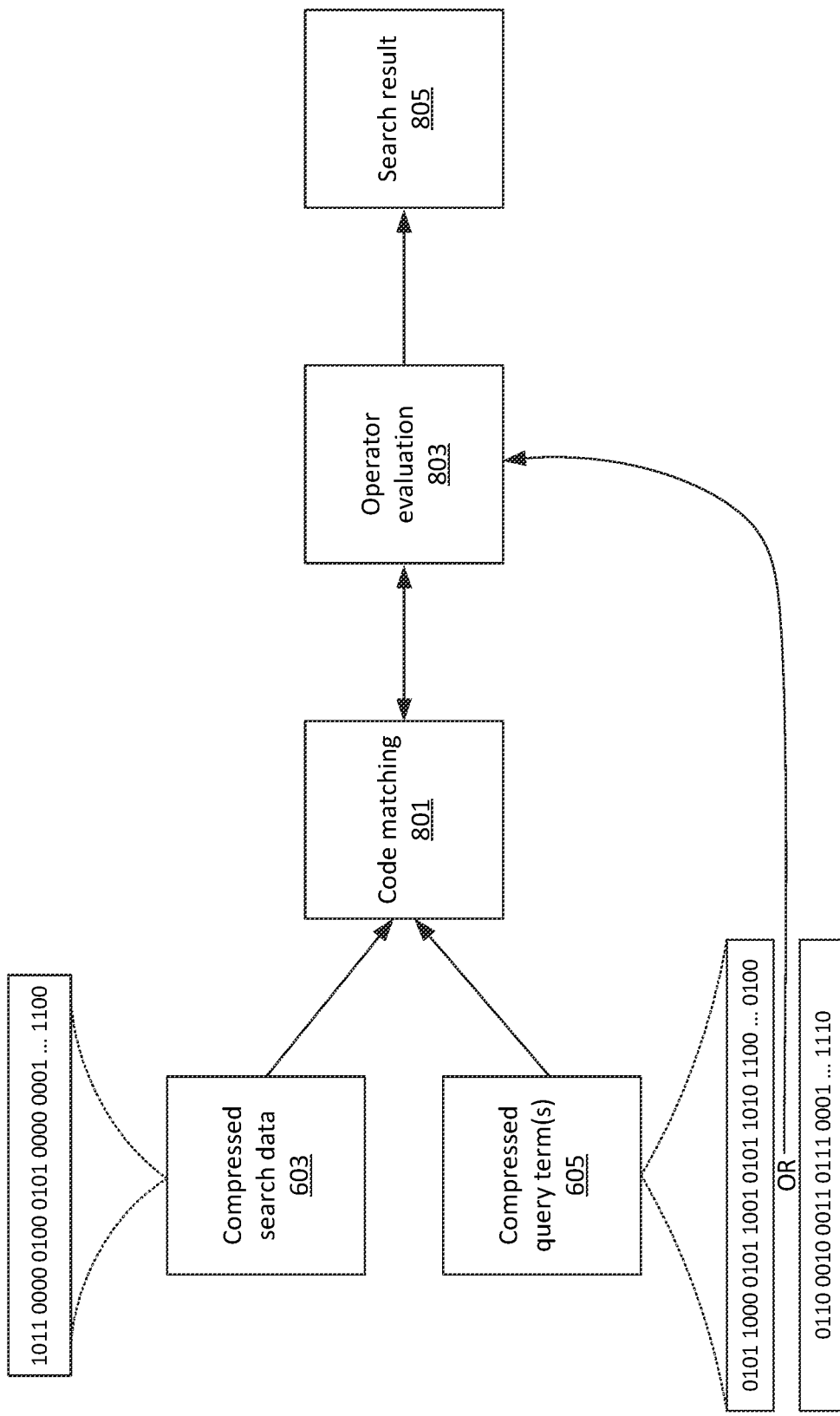
FIG. 8 illustrates an example code matching and operator evaluation operation that may be performed on a query term and/or search data, in accordance with some embodiments.

FIG. 8 illustrates an example search evaluation operation (e.g., code matching operation 801 and/or operator evaluation operation 803) that may be performed in accordance with some embodiments. In some embodiments, the search evaluation of search data 103 and/or query term(s) 105 (e.g., by SEC 111) may include code matching operation 801, operator evaluation operation 803, and/or one or more other suitable operations. For example, code matching operation 801 may include one or more operations to compare some or all of compressed query term(s) 605 to compressed search data 603. As discussed in more detail below, operator evaluation operation 803 may include determining parameters based on which code matching operation 801 should be performed, and/or a logical evaluation of one or more results determined by code matching operation 801 to determine whether such results are valid in light of operators and/or other information associated with compressed query term(s) 605.

Figure 9:
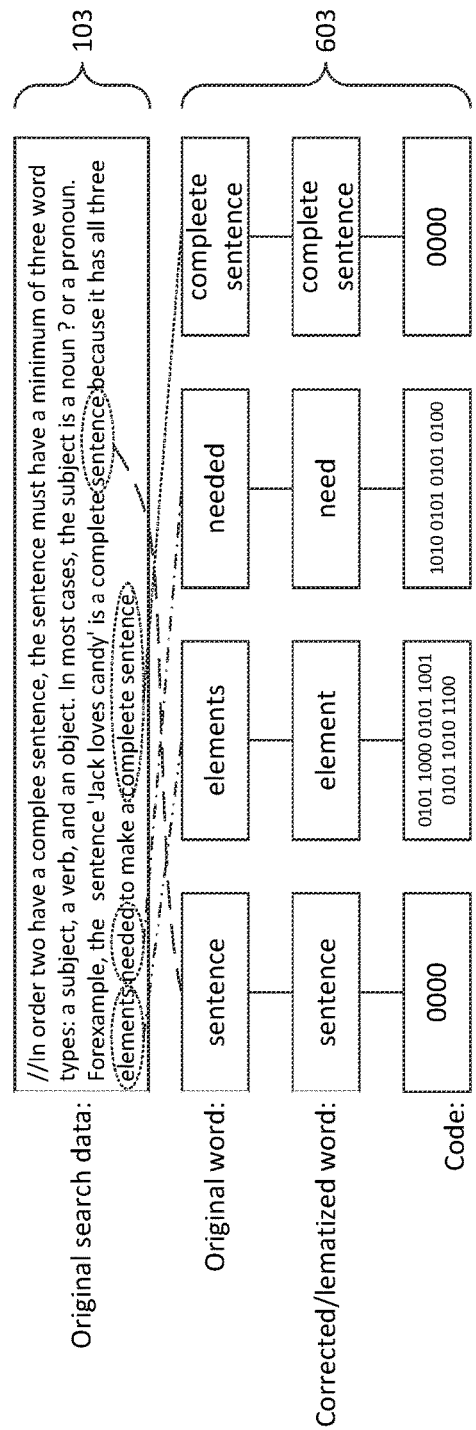
FIGS. 9-14 illustrate an example code matching operation that may be performed on a query term and/or search data, in accordance with some embodiments.
Figure 10:
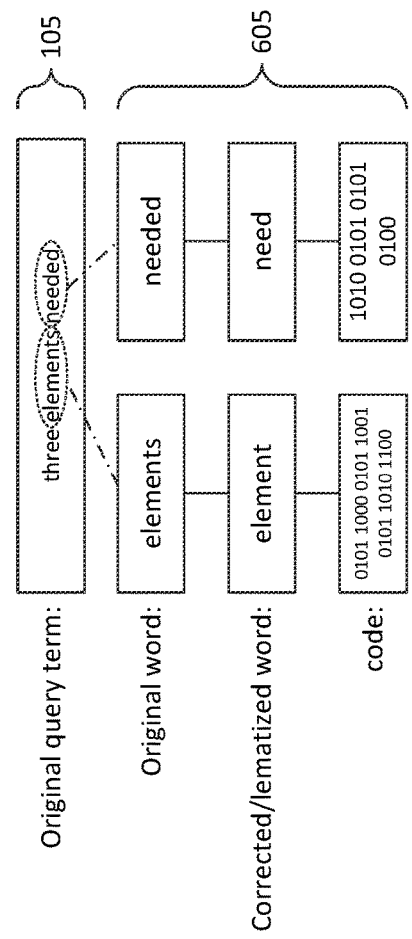

FIGS. 9-14 illustrate an example of code matching operation 801 with respect to a portion of compressed query term(s) 605. As shown in FIG. 9, for example, the words and/or strings "sentence", "element", "need", and "complete sentence" may be associated with respective codes. As noted above, some words, phrases, strings, etc., which do not include any of the characters of compressed query term(s) 605, may be represented as a single "[other]" code, such as "0000" in this example. In some embodiments, SEC 111 may maintain a mapping of compressed search data 603 to corresponding words, string, phrases, etc. of search data 103. In this manner, as described below, SEC 111 may further score and/or identify search results based on a closeness, similarity, etc. of original literal words of search data 103 to compressed query term(s) 605 and/or query term(s) 105. For example, compressed search data 603 may be tagged, annotated, etc. with the corresponding original words, strings, terms, etc. of search data 103. In some embodiments, SEC 111 may represent some or all of the information shown in FIG. 9 as a trie, array, linked list, tree, and/or some other suitable type of suitable data structure. Such data structure may suitably include information linking particular codes, or sets of codes, to particular words of search data 103, and/or sets of words. Similarly, as shown in FIG. 10, SEC 111 may generate a data structure (e.g., trie, array, linked list, tree, etc.) that includes information that correlates codes, associated with compressed query term(s) 605, to literal words included in query term(s) 105.

FIGS. 11-14 illustrates an example evaluation of compressed search data 603 based on compressed query term(s) 605, to determine whether compressed search data 603 includes an instance of any of the query strings of compressed query term(s) 605. These figures will be described in the context of the example data structures shown in FIGS. 9 and 10. In practice, an evaluation of compressed search data 603 may be performed using one or more other types of data structures and/or evaluation techniques. For example, in some embodiments, a Aho-Corasick technique or other suitable technique may be used to evaluate compressed search data 603.

Figure 11:
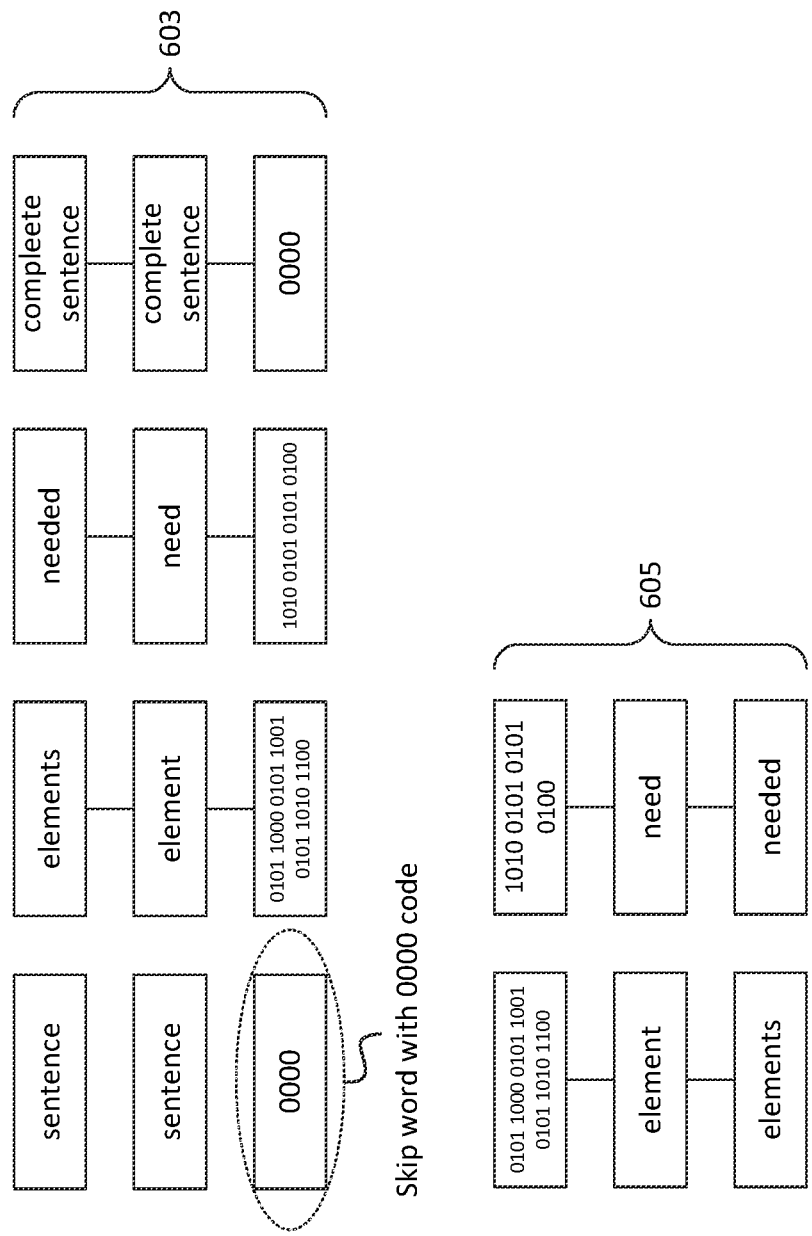

As shown in FIG. 11, for example, a particular code of compressed search data 603 may be evaluated to determine whether the code matches a code associated with compressed query term(s) 605. For example, the code representing the word "sentence" in compressed search data 603 may be compared to the code representing the word "element" in compressed query term(s) 605. In this situation, the comparison itself may not need to be performed, as the code representing this word is, or includes, the "[other]" code of "0000". As such, in some embodiments, the word "sentence" (represented by the "[other]" code of "0000") may be skipped, inasmuch as no actual portion of the code representing "element", in compressed query term(s) 605, need be compared to the "0000" code representing the word "sentence" in compressed search data 603.

Figure 12:
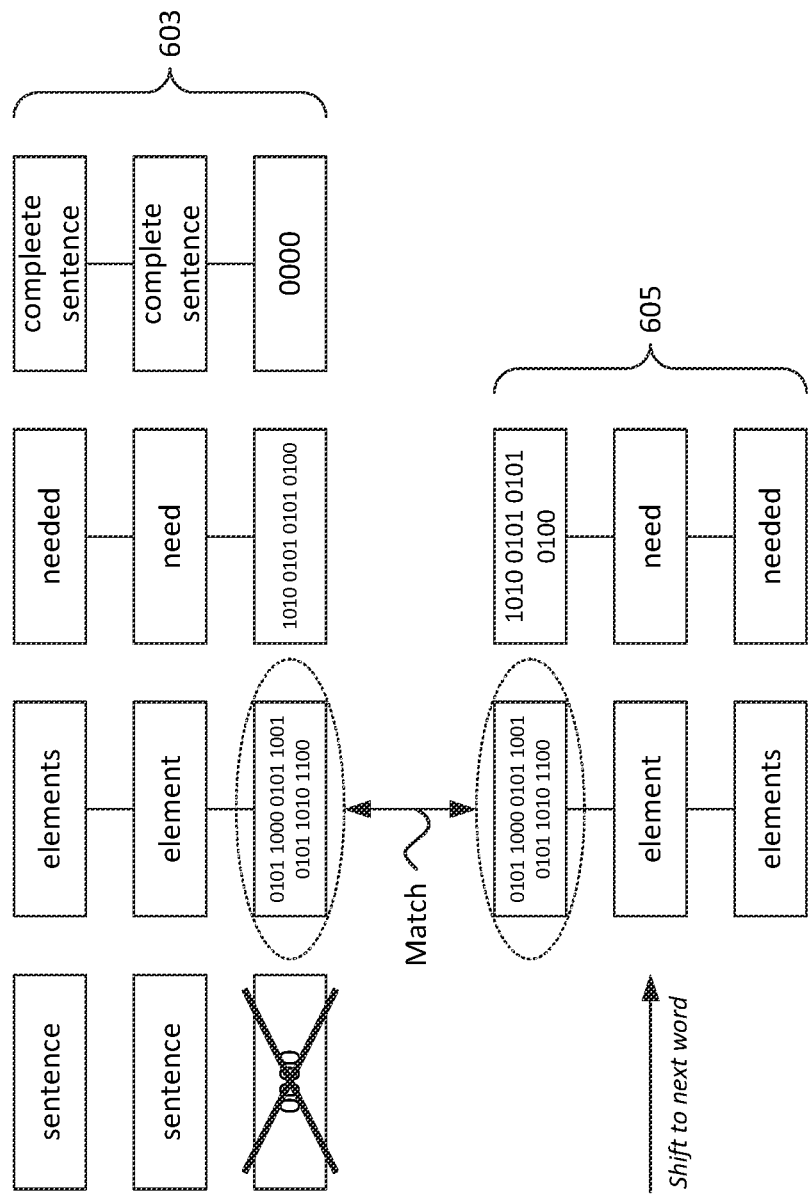

As shown in FIG. 12, the determination that "sentence", in compressed search data 603, does not match any portion of compressed query term(s) 605 may be denoted by an "X" over the code representing the word "sentence" in compressed search data 603. Code matching operation 801 may further include evaluating a next term of compressed search data 603, such as a string, term, word, etc. separated from "sentence" in compressed search data 603 by a "space" character or other suitable delineator. In this example, SEC 111 may determine that the word "element" in compressed search data 603 (e.g., derived from the word "elements" in search data 103 based on one or more of sanitization operation 201, correction operation 301, lemmatization operation 401, and/or compression operation 601) matches the word "element" in compressed query term(s) 605 (e.g., derived from the word "elements" in query term(s) 105 based on one or more of sanitization operation 201, correction operation 301, lemmatization operation 401, and/or compression operation 601). Specifically, for example, SEC 111 may determine that the code for "element", in compressed search data 603, matches the code for "element" in compressed query term(s) 605. As shown, for example, both of these codes may be "0101 1000 0101 1001 0101 1010 1100".

Figure 13:
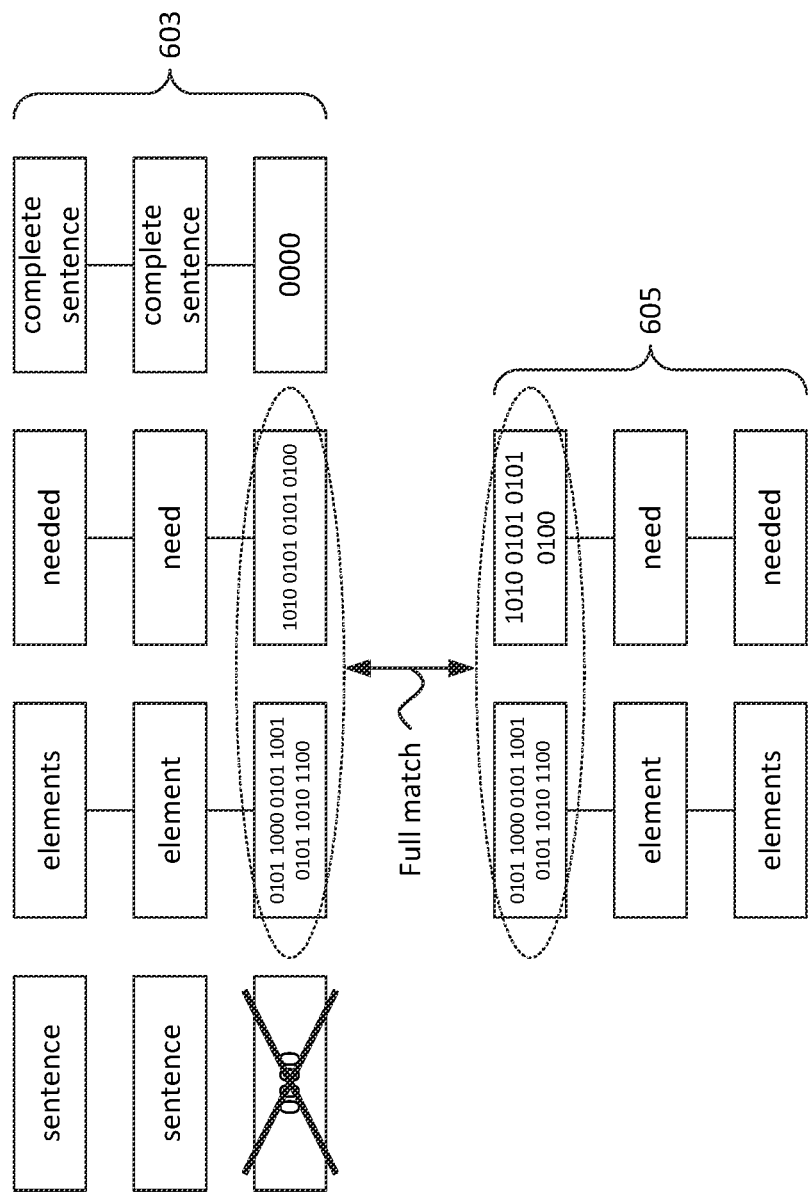

Based on determining that a first word of compressed query term(s) 605 matches a particular word of compressed search data 603, SEC 111 may proceed to evaluate compressed search data 603 to determine whether a next word of compressed search data 603 (e.g., a word succeeding the first word of compressed search data 603) matches a next word of compressed query term(s) 605 (e.g., a word succeeding the first word of compressed query term(s) 605). In the example of FIG. 13, SEC 111 may identify a "full match" between compressed search data 603 and compressed query term(s) 605. For example, the entirety of compressed query term(s) 605 may match consecutive words of compressed search data 603.

In some embodiments, while not shown here, a "full match" or other type of match may be determined when compressed search data 603 includes a variation of compressed query term(s) 605. Such variation may include one or more intervening words, characters, etc. between words of compressed query term(s) 605 located in compressed search data 603. In some embodiments, such variation may include a different order of words, in compressed search data 603, than the order of words in compressed query term(s) 605. In some embodiments, one or more other types of variations may be identified (e.g., based on operators and/or other information associated with compressed query term(s) 605). Based on the identification of a full match, SEC 111 may determine that search result 805 includes an indication that "element need" (e.g., compressed query term(s) 605) was found in compressed search data 603.

Figure 14:
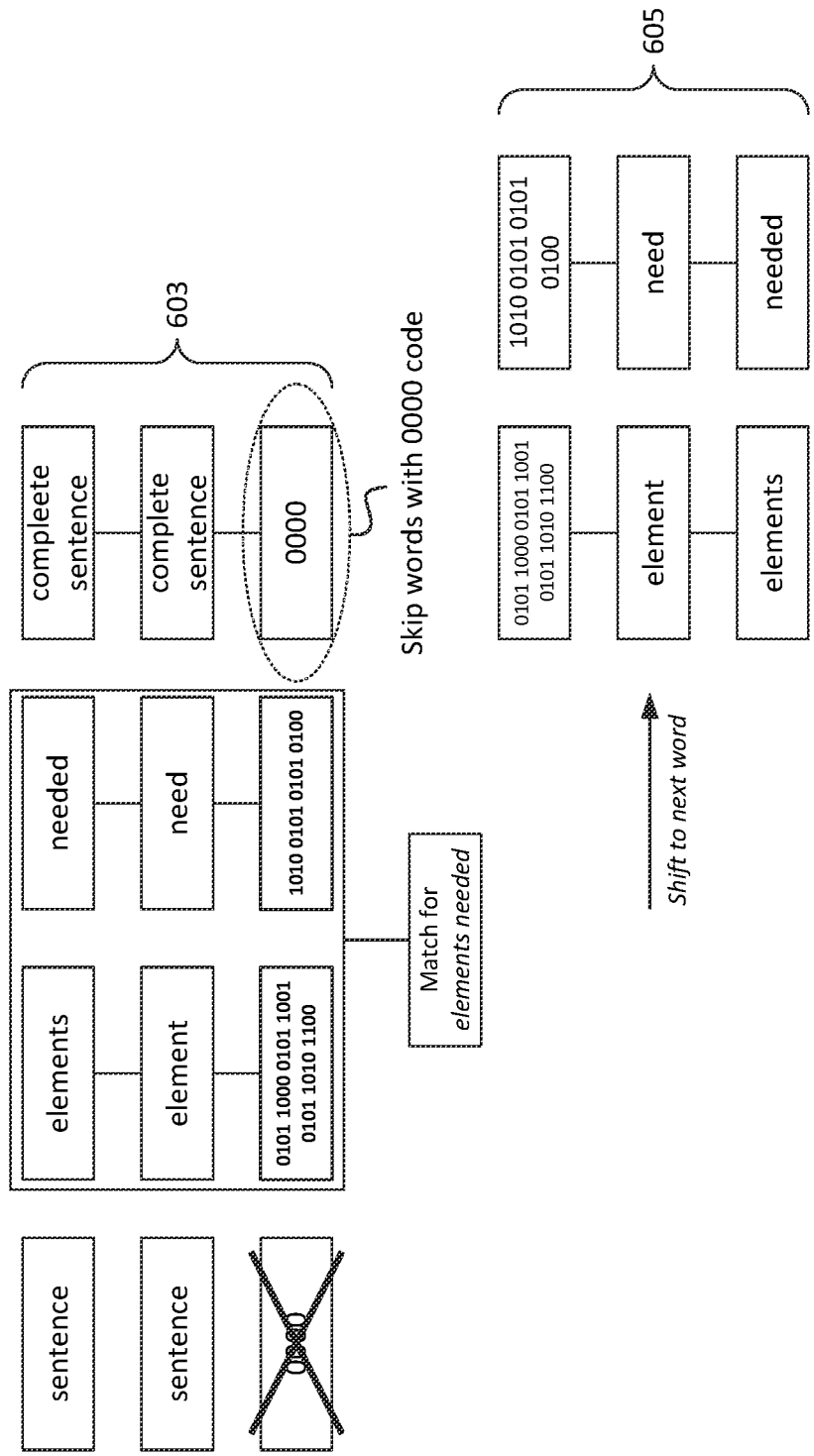

For example, as shown in FIG. 14, search result 805 may further include information linking the literal string(s) based on which the matching portions of compressed search data 603 and/or compressed query term(s) 605 were generated. For example, search result 805 may include an indication that "elements needed" (e.g., the literal portion of search data 103 based on which "element need" of compressed search data 603 was generated) matches "elements needed" (e.g., the literal portion of query term(s) 105 based on which "element need" of compressed query term(s) 605 was generated). As further shown in FIG. 14, code matching operation 801 may further include continuing to evaluate compressed search data 603 for further instances of compressed query term(s) 605. For example, as shown, the words "complete sentence" of compressed search data 603 (e.g., as represented by a single "0000" code, as discussed above), may be evaluated. In this example, as similarly discussed above, these words may be skipped, as these words are represented by a "0000" code, indicating that neither word is entirely made up of characters that are included in compressed query term(s) 605.

Returning to FIG. 8, SEC 111 may further perform operator evaluation operation 803 in order to evaluate compound query terms, and/or query terms otherwise separated by an operator or other suitable computation. For example, in the example here, compressed query term(s) 605 includes an OR operator. As such, operator evaluation operation 803 may result in a determination that code matching operation 801 should be performed twice—once to determine whether compressed search data 603 includes "element need" and a second time to determine whether compressed search data 603 includes "jack love candy". Code matching operation 801 may include performing any logical computations, such as the OR operator associated with compressed query term(s) 605. In this example, operator evaluation operation 803 may include determining that search result 805 includes one or more results (e.g., in compressed search data 603) for both "element need" and "jack love candy". As the operator in this example is an OR operator, both terms may be included in search result 805.

In an alternate example, assume that a compressed query term includes an AND operator instead of the OR operator of compressed query term(s) 605. Code matching operation 801 may, in some embodiments, include evaluating compressed search data 603 to determine whether compressed search data 603 includes at least two terms separated by the AND operator. In other example scenarios, other types of operators may be used, and operator evaluation operation 803 may include further evaluating one or more terms found by way of code matching operation 801 to determine whether such terms are a match for compressed query term(s) 605 (e.g., in light of operators included in compressed query term(s) 605).

Operator evaluation operation 803 may further utilize such operators when ultimately generating search result 805. For example, assume that compressed query term(s) 605 includes an AND operator between a first compressed query string (e.g., a code representing the first query string, based on one or more compression techniques discussed above) and a second compressed query string. Further assume that the first and second query strings are separated by an AND operator. Further assume that based on code matching operation 801, only one query string (e.g., only the first, and not the second, query string) was found in compressed search data 603. While code matching operation 801 may yield one "positive" result (e.g., the identification of the first query string in compressed search data 603), operator evaluation operation 803 may determine that search result 805 should indicate no results, as the first query string AND the second query string were not found.

In some embodiments, SEC 111 may perform one or more other suitable operations on the results determined by code matching operation 801 and/or operator evaluation operation 803. For example, SEC 111 may rank results based on closeness of the results to compressed query term(s) 605 and/or to query term(s) 105. For example, SEC 111 may identify the original words in search data 103, which were mapped to codes in compressed search data 603, and may further identify the original words in query term(s) 105, which were mapped to codes in compressed query term(s) 605 (e.g., as discussed above with respect to FIG. 9). For example, if the original search data included an instance of the word "compleete" and an instance of the word "complete", the sanitized, corrected, etc. version of the search data may include two instances of the word "complete" as well as tags, annotations, etc. linking these instances of "complete" to "compleete" and "complete", respectively. Once search result 805 has been generated, SEC 111 may identify the mappings of the sanitized, corrected, etc. version of the search data to the original search data (e.g., the respective mapping of the instances of "complete" to "compleete" and "complete"), and may rank the result that includes "complete" higher than the result that includes "compleete". In some embodiments, SEC 111 may rank search results in other suitable ways based on the mapping of the sanitized, corrected, etc. search data to the original search data.

Figure 15:
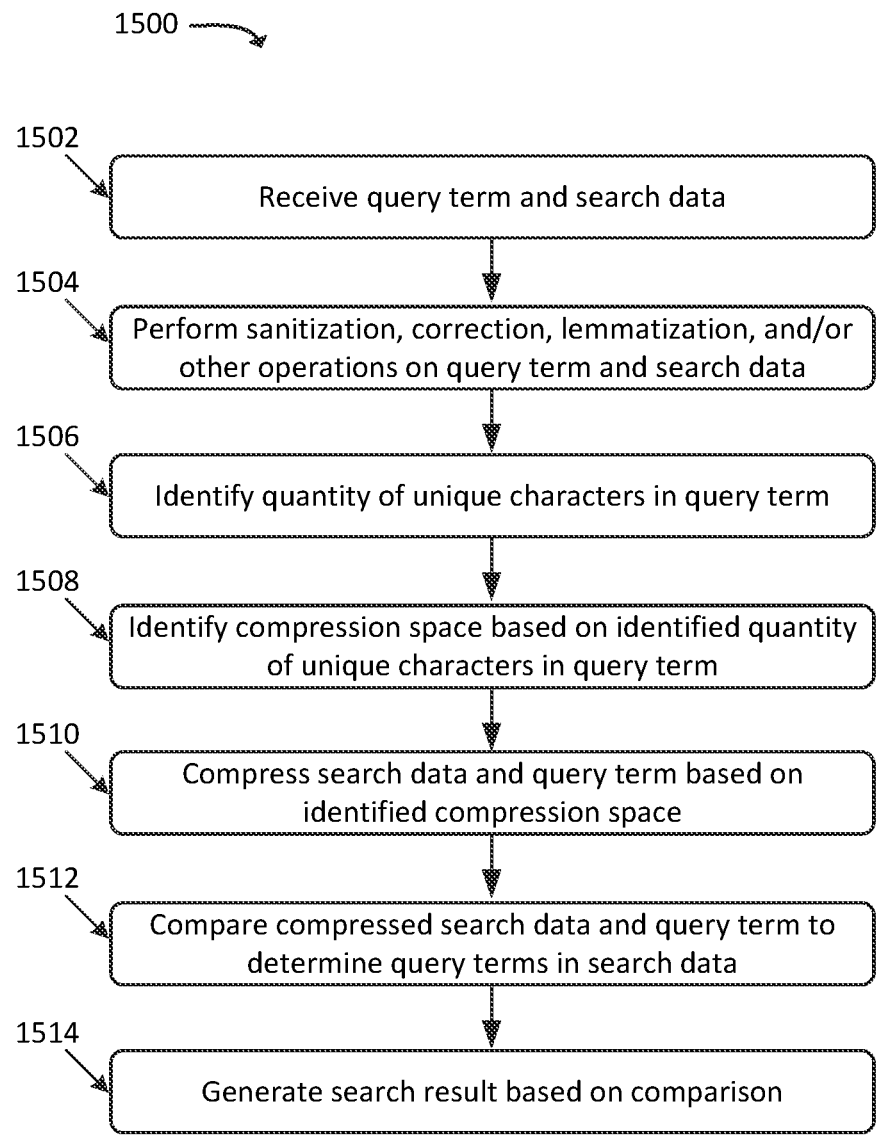
FIG. 15 illustrates an example process for evaluating search data based on one or more query terms, including compressing the one or more query terms and the search data, in accordance with some embodiments.

FIG. 15 illustrates an example process 1500 for evaluating search data based on one or more query terms, including compressing the one or more query terms and the search data, in accordance with some embodiments. In some embodiments, some or all of process 1500 may be performed by SDC 101 and/or SEC 111. In some embodiments, one or more other devices may perform some or all of process 1500 in concert with, and/or in lieu of, SDC 101 and/or SEC 111.

As shown, process 1500 may include receiving (at 1502) a query term and search data. For example, SDC 101 and/or SEC 111 may receive a query term via a web page, an application, a search engine input interface, or the like. The search data may be received, identified, obtained, etc. by an automated process, such as "crawling" web pages, logs, and/or other suitable data to be searched.

Process 1500 may further include performing (at 1504) sanitization, correction, lemmatization, and/or other suitable operations. For example, SDC 101 and/or SEC 111 may perform sanitization operation 201, correction operation 301, lemmatization operation 401, and/or other suitable operations to prepare search data 103 and/or query term(s) 105 for compression. The sanitization, correction, lemmatization, etc. may serve to improve the fidelity of search results, such as reducing false positives as well as increasing positive results in the case of variations on words, including misspellings, different tenses, etc.

Process 1500 may additionally include identifying (at 1506) a quantity of unique characters in the query term. For example, SDC 101 and/or SEC 111 may identify a quantity of unique characters in the sanitized, corrected, lemmatized, etc. (at 1504) version of the query term. For example, the word "lull" may have two unique characters: "l" and "u".

Process 1500 may also include identifying (at 1508) a compression space based on the identified quantity of unique characters in the query term. For example, the compression space may be based on the quantity of unique terms, plus an additional count for a "space" character, or other suitable delimiter or delineation character. Additionally, or alternatively, the compression space may be based on the quantity of unique terms, plus an additional count to represent the set of characters not included in the query term. In some embodiments, the total count for the compression space may be the quantity of unique characters in the query term plus two (e.g., to represent the "space" character or other delimiter, as well as to represent the set of characters not included in the query term). In some embodiments, identifying the compression space may include performing a base two log function on the total count. For example, if the quantity of unique characters is x, then the compression space may be the ceiling of $\log_2(x+2)$. In some embodiments, the result of the identification of the compression space may be represented by a compression space encoding table, such as the one shown in FIG. 5.

Process 1500 may further include compressing (at 1510) the search data and the query term based on the identified compression space. For example, SDC 101 and/or SEC 111 may map each character, in the search data and the query term, to a corresponding code determined based on the compression space. For example, as noted above, SDC 101 and/or SEC 111 may compress entire words of the search data into a single code (e.g., a code representing characters not included in the unique characters of the query term), in situations where a given word of the search data includes at least one character not included in the query term. As further discussed, multiple (e.g., consecutive) words of the search data may be compressed into the same single code. In some embodiments, SDC 101 and/or SEC 111 may maintain a mapping of original words of the query term and/or search data to the compressed versions, such that search results determined based on the compressed search data and/or query term may be evaluated for a measure of closeness, similarity, etc. to the original query term.

Process 1500 may additionally include comparing (at 1512) the compressed search data and query term to determine which, if any, portions of the compressed query term are present in the compressed search data. For example, SDC 101 and/or SEC 111 may perform a bitwise comparison, may use a tagged trie and/or some other suitable data structure, may perform a search using a Aho-Corasick technique, and/or otherwise identify portions of the compressed query term that are present in the compressed search data. For example, some embodiments may use mapping 115 to correspond paths of a finite state machine, trie, or other suitable data structure associated with the Aho-Corasick technique, where such paths represent a particular code of the compressed search data. In some embodiments, "leaf" or "end" nodes of such finite state machines, tries, or the like may be associated with respective words of the original search data. Traversal of particular paths to the "leaf" or "end" nodes may indicate the presence of codes corresponding to such paths, and therefore a match (or potential match) between one or more query terms and one or more words of the search data. As discussed above, SDC 101 and/or SEC 111 may further evaluate any matches between the compressed query term and the compressed search data based on operators or other types of information included in the original query term.

Process 1500 may also include generating (at 1514) a search result based on the comparison. In some embodiments, SDC 101 and/or SEC 111 may use the mappings of the original versions of the query term and/or the search data to rank the identified results, as discussed above. For example, a first result for which the original search data is closer to the original query term may be ranked higher than a second result for which the original search data is less close to the original query term.

Figure 16:
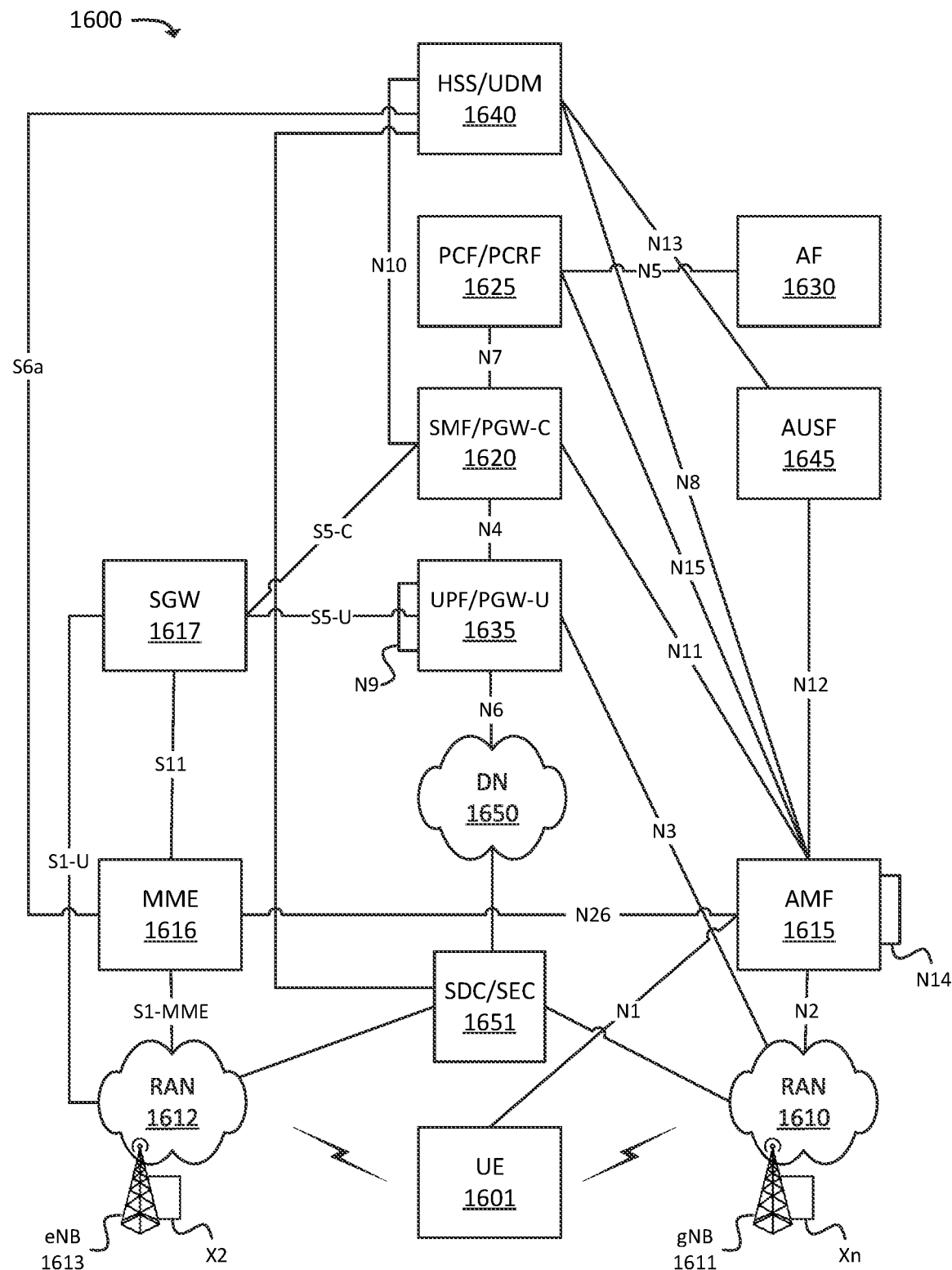
FIG. 16 illustrates an example environment in which one or more embodiments, described herein, may be implemented.

FIG. 16 illustrates an example environment 1600, in which one or more embodiments may be implemented. In some embodiments, environment 1600 may correspond to a Fifth Generation ("5G") network, and/or may include elements of a 5G network. In some embodiments, environment 1600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1600 may include UE 1601, RAN 1610 (which may include one or more Next Generation Node Bs ("gNBs") 1611), RAN 1612 (which may include one or more one or more evolved Node Bs ("eNBs") 1613), and various network functions such as Access and Mobility Management Function ("AMF") 1615, Mobility Management Entity ("MME") 1616, Serving Gateway ("SGW") 1617, Session Management Function ("SMF")/Packet Data Network ("PDN") Gateway ("PGW")-Control plane function ("PGW-C") 1620, Policy Control Function ("PCF")/Policy Charging and Rules Function ("PCRF") 1625, Application Function ("AF") 1630, User Plane Function ("UPF")/PGW-User plane function ("PGW-U") 1635, Home Subscriber Server ("HSS")/Unified Data Management ("UDM") 1640, and Authentication Server Function ("AUSF") 1645. Environment 1600 may also include one or more networks, such as Data Network ("DN") 1650. Environment 1600 may include one or more additional devices or systems communicatively coupled to one or more networks (e.g., DN 1650), such as SDC/SEC 1651.

The example shown in FIG. 16 illustrates one instance of each network component or function (e.g., one instance of SMF/PGW-C 1620, PCF/PCRF 1625, UPF/PGW-U 1635, HSS/UDM 1640, and/or 1645). In practice, environment 1600 may include multiple instances of such components or functions. For example, in some embodiments, environment 1600 may include multiple "slices" of a core network, where each slice includes a discrete set of network functions (e.g., one slice may include a first instance of SMF/PGW-C 1620, PCF/PCRF 1625, UPF/PGW-U 1635, HSS/UDM 1640, and/or 1645, while another slice may include a second instance of SMF/PGW-C 1620, PCF/PCRF 1625, UPF/PGW-U 1635, HSS/UDM 1640, and/or 1645). The different slices may provide differentiated levels of service, such as service in accordance with different Quality of Service ("QoS") parameters.

The quantity of devices and/or networks, illustrated in FIG. 16, is provided for explanatory purposes only. In practice, environment 1600 may include additional devices and/or networks, fewer devices and/or networks, different devices and/or networks, or differently arranged devices and/or networks than illustrated in FIG. 16. For example, while not shown, environment 1600 may include devices that facilitate or enable communication between various components shown in environment 1600, such as routers, modems, gateways, switches, hubs, etc. Alternatively, or additionally, one or more of the devices of environment 1600 may perform one or more network functions described as being performed by another one or more of the devices of environment 1600. Devices of environment 1600 may interconnect with each other and/or other devices via wired connections, wireless connections, or a combination of wired and wireless connections. In some implementations, one or more devices of environment 1600 may be physically integrated in, and/or may be physically attached to, one or more other devices of environment 1600.

UE 1601 may include a computation and communication device, such as a wireless mobile communication device that is capable of communicating with RAN 1610, RAN 1612, and/or DN 1650. UE 1601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1601 may send traffic to and/or receive traffic (e.g., user plane traffic) from DN 1650 via RAN 1610, RAN 1612, and/or UPF/PGW-U 1635.

RAN 1610 may be, or may include, a 5G RAN that includes one or more base stations (e.g., one or more gNBs 1611), via which UE 1601 may communicate with one or more other elements of environment 1600. UE 1601 may communicate with RAN 1610 via an air interface (e.g., as provided by gNB 1611). For instance, RAN 1610 may receive traffic (e.g., voice call traffic, data traffic, messaging traffic, signaling traffic, etc.) from UE 1601 via the air interface, and may communicate the traffic to UPF/PGW-U 1635, and/or one or more other devices or networks. Similarly, RAN 1610 may receive traffic intended for UE 1601 (e.g., from UPF/PGW-U 1635, AMF 1615, and/or one or more other devices or networks) and may communicate the traffic to UE 1601 via the air interface.

RAN 1612 may be, or may include, a LTE RAN that includes one or more base stations (e.g., one or more eNBs 1613), via which UE 1601 may communicate with one or more other elements of environment 1600. UE 1601 may communicate with RAN 1612 via an air interface (e.g., as provided by eNB 1613). For instance, RAN 1610 may receive traffic (e.g., voice call traffic, data traffic, messaging traffic, signaling traffic, etc.) from UE 1601 via the air interface, and may communicate the traffic to UPF/PGW-U 1635, and/or one or more other devices or networks. Similarly, RAN 1610 may receive traffic intended for UE 1601 (e.g., from UPF/PGW-U 1635, SGW 1617, and/or one or more other devices or networks) and may communicate the traffic to UE 1601 via the air interface.

AMF 1615 may include one or more devices, systems, Virtualized Network Functions ("VNFs"), etc., that perform operations to register UE 1601 with the 5G network, to establish bearer channels associated with a session with UE 1601, to hand off UE 1601 from the 5G network to another network, to hand off UE 1601 from the other network to the 5G network, manage mobility of UE 1601 between RANs 1610 and/or gNBs 1611, and/or to perform other operations. In some embodiments, the 5G network may include multiple AMFs 1615, which communicate with each other via the N14 interface (denoted in FIG. 16 by the line marked "N14" originating and terminating at AMF 1615).

MME 1616 may include one or more devices, systems, VNFs, etc., that perform operations to register UE 1601 with the EPC, to establish bearer channels associated with a session with UE 1601, to hand off UE 1601 from the EPC to another network, to hand off UE 1601 from another network to the EPC, manage mobility of UE 1601 between RANs 1612 and/or eNBs 1613, and/or to perform other operations.

SGW 1617 may include one or more devices, systems, VNFs, etc., that aggregate traffic received from one or more eNBs 1613 and send the aggregated traffic to an external network or device via UPF/PGW-U 1635. Additionally, SGW 1617 may aggregate traffic received from one or more UPF/PGW-Us 1635 and may send the aggregated traffic to one or more eNBs 1613. SGW 1617 may operate as an anchor for the user plane during inter-eNB handovers and as an anchor for mobility between different telecommunication networks or RANs (e.g., RANs 1610 and 1612).

SMF/PGW-C 1620 may include one or more devices, systems, VNFs, etc., that gather, process, store, and/or provide information in a manner described herein. SMF/PGW-C 1620 may, for example, facilitate in the establishment of communication sessions on behalf of UE 1601. In some embodiments, the establishment of communications sessions may be performed in accordance with one or more policies provided by PCF/PCRF 1625.

PCF/PCRF 1625 may include one or more devices, systems, VNFs, etc., that aggregate information to and from the 5G network and/or other sources. PCF/PCRF 1625 may receive information regarding policies and/or subscriptions from one or more sources, such as subscriber databases and/or from one or more users (such as, for example, an administrator associated with PCF/PCRF 1625).

AF 1630 may include one or more devices, systems, VNFs, etc., that receive, store, and/or provide information that may be used in determining parameters (e.g., quality of service parameters, charging parameters, or the like) for certain applications.

UPF/PGW-U 1635 may include one or more devices, systems, VNFs, etc., that receive, store, and/or provide data (e.g., user plane data). For example, UPF/PGW-U 1635 may receive user plane data (e.g., voice call traffic, data traffic, etc.), destined for UE 1601, from DN 1650, and may forward the user plane data toward UE 1601 (e.g., via RAN 1610, SMF/PGW-C 1620, and/or one or more other devices). In some embodiments, multiple UPFs 1635 may be deployed (e.g., in different geographical locations), and the delivery of content to UE 1601 may be coordinated via the N9 interface (e.g., as denoted in FIG. 16 by the line marked "N9" originating and terminating at UPF/PGW-U 1635). Similarly, UPF/PGW-U 1635 may receive traffic from UE 1601 (e.g., via RAN 1610, SMF/PGW-C 1620, and/or one or more other devices), and may forward the traffic toward DN 1650. In some embodiments, UPF/PGW-U 1635 may communicate (e.g., via the N4 interface) with SMF/PGW-C 1620, regarding user plane data processed by UPF/PGW-U 1635.

HSS/UDM 1640 and AUSF 1645 may include one or more devices, systems, VNFs, etc., that manage, update, and/or store, in one or more memory devices associated with AUSF 1645 and/or HSS/UDM 1640, profile information associated with a subscriber. AUSF 1645 and/or HSS/UDM 1640 may perform authentication, authorization, and/or accounting operations associated with the subscriber and/or a communication session with UE 1601.

DN 1650 may include one or more wired and/or wireless networks. For example, DN 1650 may include an Internet Protocol ("IP")-based PDN, a wide area network ("WAN") such as the Internet, a private enterprise network, and/or one or more other networks. UE 1601 may communicate, through DN 1650, with data servers, other UEs 1601, and/or to other servers or applications that are coupled to DN 1650. DN 1650 may be connected to one or more other networks, such as a public switched telephone network ("PSTN"), a public land mobile network ("PLMN"), and/or another network. DN 1650 may be connected to one or more devices, such as content providers, applications, web servers, and/or other devices, with which UE 1601 may communicate.

SDC/SEC 1651 may include one or more devices, systems, VNFs, etc. that perform one or more operations described above with respect to SDC 101 and/or SEC 111. For example, SDC/SEC 1651 may perform sanitization operation 201, correction operation 301, lemmatization operation 401, compression space identification operation 501, compression operation 601, code matching operation 801, and/or operator evaluation operation 803. For example, SDC/SEC 1651 may generate search results based on one or more query terms and search data. In some embodiments, the search results may be evaluated, identified, etc. using compression techniques described above, in which characters of search terms and/or search data may be compressed into a compression space different from a "standard" encoding space, including eight-bit encoding schemes such as ASCII, UTF-8, etc. Based on the reduced encoding space, the evaluation of the search data (e.g., to determine whether any query terms are included in the search data) by SDC/SEC 1651 may be faster, and consume less resources (e.g., processor resources, memory resources, etc.) than techniques that do not utilize such compression techniques.

Figure 17:
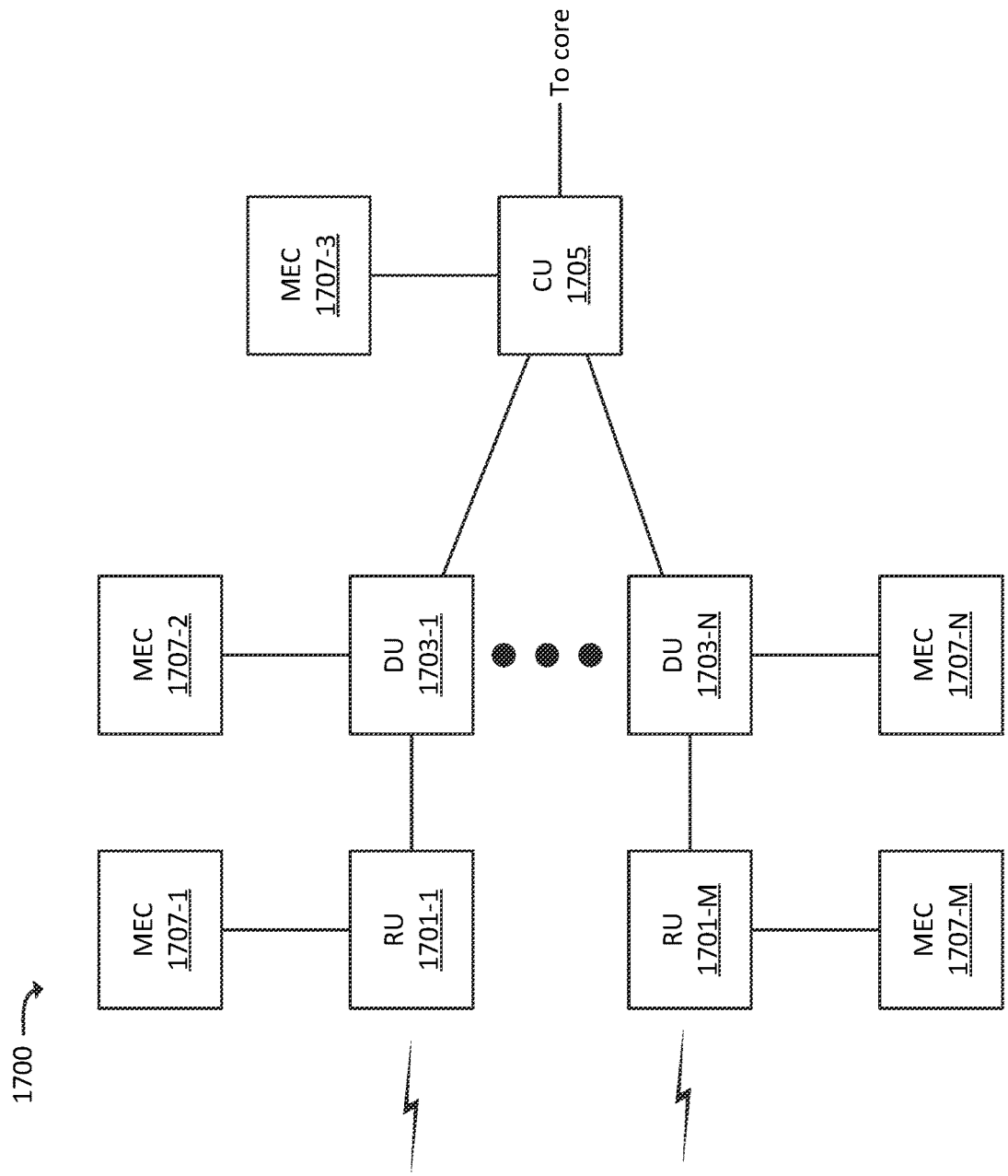
FIG. 17 illustrates an example arrangement of a radio access network ("RAN"), in accordance with some embodiments.

FIG. 17 illustrates an example Distributed Unit ("DU") network 1700, which may be included in and/or implemented by one or more RANs (e.g., RAN 1610, RAN 1612, or some other RAN). In some embodiments, a particular RAN may include one DU network 1700. In some embodiments, a particular RAN may include multiple DU networks 1700. In some embodiments, DU network 1700 may correspond to a particular gNB 1611 of a 5G RAN (e.g., RAN 1610). In some embodiments, DU network 1700 may correspond to multiple gNBs 1611. In some embodiments, DU network 1700 may correspond to one or more other types of base stations of one or more other types of RANs. As shown, DU network 1700 may include Central Unit ("CU") 1705, one or more Distributed Units ("DUs") 1703-1 through 1703-N (referred to individually as "DU 1703," or collectively as "DUs 1703"), and one or more Radio Units ("RUs") 1701-1 through 1701-M (referred to individually as "RU 1701," or collectively as "RUs 1701").

CU 1705 may communicate with a core of a wireless network (e.g., may communicate with one or more of the devices or systems described above with respect to FIG. 16, such as AMF 1615 and/or UPF/PGW-U 1635). In the uplink direction (e.g., for traffic from UEs 1601 to a core network), CU 1705 may aggregate traffic from DUs 1703, and forward the aggregated traffic to the core network. In some embodiments, CU 1705 may receive traffic according to a given protocol (e.g., Radio Link Control ("RLC")) from DUs 1703, and may perform higher-layer processing (e.g., may aggregate/process RLC packets and generate Packet Data Convergence Protocol ("PDCP") packets based on the RLC packets) on the traffic received from DUs 1703.

In accordance with some embodiments, CU 1705 may receive downlink traffic (e.g., traffic from the core network) for a particular UE 1601, and may determine which DU(s) 1703 should receive the downlink traffic. DU 1703 may include one or more devices that transmit traffic between a core network (e.g., via CU 1705) and UE 1601 (e.g., via a respective RU 1701). DU 1703 may, for example, receive traffic from RU 1701 at a first layer (e.g., physical ("PHY") layer traffic, or lower PHY layer traffic), and may process/aggregate the traffic to a second layer (e.g., upper PHY and/or RLC). DU 1703 may receive traffic from CU 1705 at the second layer, may process the traffic to the first layer, and provide the processed traffic to a respective RU 1701 for transmission to UE 1601.

RU 1701 may include hardware circuitry (e.g., one or more RF transceivers, antennas, radios, and/or other suitable hardware) to communicate wirelessly (e.g., via an RF interface) with one or more UEs 1601, one or more other DUs 1703 (e.g., via RUs 1701 associated with DUs 1703), and/or any other suitable type of device. In the uplink direction, RU 1701 may receive traffic from UE 1601 and/or another DU 1703 via the RF interface and may provide the traffic to DU 1703. In the downlink direction, RU 1701 may receive traffic from DU 1703, and may provide the traffic to UE 1601 and/or another DU 1703.

RUs 1701 may, in some embodiments, be communicatively coupled to one or more Multi-Access/Mobile Edge Computing ("MEC") devices, referred to sometimes herein simply as ("MECs") 1707. For example, RU 1701-1 may be communicatively coupled to MEC 1707-1, RU 1701-M may be communicatively coupled to MEC 1707-M, DU 1703-1 may be communicatively coupled to MEC 1707-2, DU 1703-N may be communicatively coupled to MEC 1707-N, CU 1705 may be communicatively coupled to MEC 1707-3, and so on. MECs 1707 may include hardware resources (e.g., configurable or provisionable hardware resources) that may be configured to provide services and/or otherwise process traffic to and/or from UE 1601, via a respective RU 1701.

For example, RU 1701-1 may route some traffic, from UE 1601, to MEC 1707-1 instead of to a core network (e.g., via DU 1703 and CU 1705). MEC 1707-1 may process the traffic, perform one or more computations based on the received traffic, and may provide traffic to UE 1601 via RU 1701-1. In this manner, ultra-low latency services may be provided to UE 1601, as traffic does not need to traverse DU 1703, CU 1705, and an intervening backhaul network between DU network 1700 and the core network. In some embodiments, MEC 1707 may include, and/or may implement, some or all of the functionality described above with respect to SDC/SEC 1651.

Figure 18:
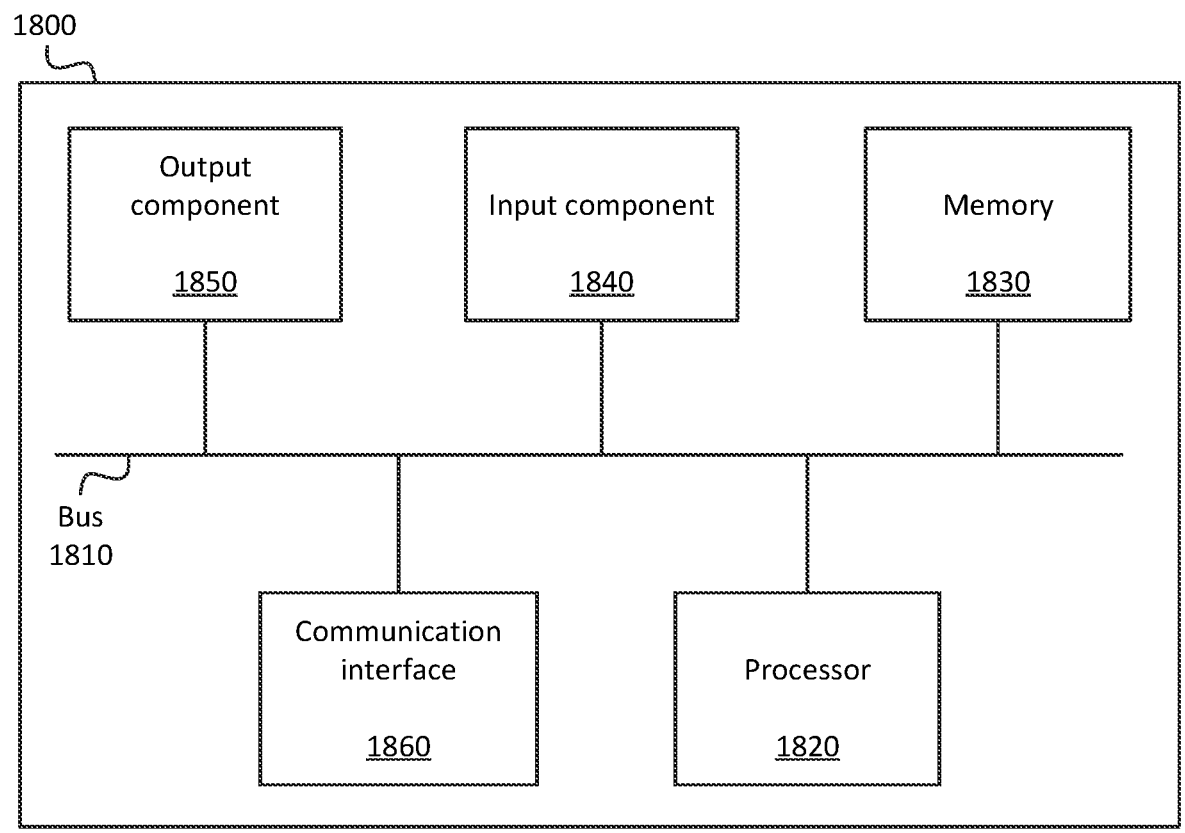
FIG. 18 illustrates example components of one or more devices, in accordance with one or more embodiments described herein.

FIG. 18 illustrates example components of device 1800. One or more of the devices described above may include one or more devices 1800. Device 1800 may include bus 1810, processor 1820, memory 1830, input component 1840, output component 1850, and communication interface 1860. In another implementation, device 1800 may include additional, fewer, different, or differently arranged components.

Bus 1810 may include one or more communication paths that permit communication among the components of device 1800. Processor 1820 may include a processor, microprocessor, or processing logic that may interpret and execute instructions. Memory 1830 may include any type of dynamic storage device that may store information and instructions for execution by processor 1820, and/or any type of non-volatile storage device that may store information for use by processor 1820.

Input component 1840 may include a mechanism that permits an operator to input information to device 1800 and/or other receives or detects input from a source external to 1840, such as a touchpad, a touchscreen, a keyboard, a keypad, a button, a switch, a microphone or other audio input component, etc. In some embodiments, input component 1840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1850 may include a mechanism that outputs information to the operator, such as a display, a speaker, one or more light emitting diodes ("LEDs"), etc.

Communication interface 1860 may include any transceiver-like mechanism that enables device 1800 to communicate with other devices and/or systems. For example, communication interface 1860 may include an Ethernet interface, an optical interface, a coaxial interface, or the like. Communication interface 1860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1800 may include more than one communication interface 1860. For instance, device 1800 may include an optical interface and an Ethernet interface.

Device 1800 may perform certain operations relating to one or more processes described above. Device 1800 may perform these operations in response to processor 1820 executing software instructions stored in a computer-readable medium, such as memory 1830. A computer-readable medium may be defined as a non-transitory memory device. A memory device may include space within a single physical memory device or spread across multiple physical memory devices. The software instructions may be read into memory 1830 from another computer-readable medium or from another device. The software instructions stored in memory 1830 may cause processor 1820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-15), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a query term comprising a first set of strings;
receive search data comprising a second set of strings;
identify a particular set of characters that are included in the first set of strings;
identify a compression space based on the particular set of characters included in the first set of strings, wherein identifying the compression space includes determining a quantity of bits to use to represent the particular set of characters included in the first and second sets of strings, the quantity of bits being based on a quantity of unique characters in the first set of strings;
compress the first set of strings based on the identified compression space;
compress the second set of strings based on the identified compression space;
compare the compressed first set of strings to the compressed second set of strings to determine whether the second set of strings includes any strings of the first set of strings; and
generate a search result, based on the comparing, that indicates instances of the first set of strings that were identified in the second set of strings.

2. The device of claim 1, wherein the particular quantity of further bits further represents a "space" character and an additional code that represents a set of characters that are not included in the unique characters included in the first set of strings.

3. The device of claim 1, wherein determining the particular quantity of bits includes performing a logarithm function on the particular quantity of unique characters included in the first set of strings.

4. The device of claim 1, wherein the one or more processors are further configured to:
perform, prior to the compressing of the first and second sets of strings, at least one of:
a sanitization operation on the first and second sets of strings,
a correction operation on the first and second sets of strings, or
a lemmatization operation on the first and second sets of strings.

5. The device of claim 1, wherein compressing the first set of strings includes:
generating a code that represents each string, in the first set of strings; and
generating a mapping between each generated code to a corresponding particular string of the first set of strings.

6. A non-transitory computer-readable medium, storing a plurality of processor-executable instructions to:
receive a query term comprising a first set of strings;
receive search data comprising a second set of strings;

identify a particular set of characters that are included in the first set of strings;

identify a compression space based on the particular set of characters included in the first set of strings, wherein identifying the compression space includes determining a quantity of bits to use to represent the particular set of characters included in the first and second sets of strings, the quantity of bits being based on a quantity of unique characters in the first set of strings;

compress the first set of strings based on the identified compression space;

compress the second set of strings based on the identified compression space;

compare the compressed first set of strings to the compressed second set of strings to determine whether the second set of strings includes any strings of the first set of strings; and generate a search result, based on the comparing, that indicates instances of the first set of strings that were identified in the second set of strings.

7. The non-transitory computer-readable medium of claim 6, wherein the particular quantity of further bits further represents a "space" character and an additional code that represents a set of characters that are not included in the unique characters included in the first set of strings.

8. The non-transitory computer-readable medium of claim 6, wherein determining the particular quantity of bits includes performing a logarithm function on the particular quantity of unique characters included in the first set of strings.

9. The non-transitory computer-readable medium of claim 6, wherein the plurality of processor-executable instructions further include processor-executable instructions to:

perform, prior to tne compressing of the first and second sets ot strings, at least one of:
  a sanitization operation on the first and second sets of strings,
  a correction operation on the first and second sets of strings, or
  a lemmatization operation on the first and second sets of strings.

10. The non-transitory computer-readable medium of claim 6, wherein compressing the first set of strings includes:
  generating a code that represents each string, in the first set of strings; and
  generating a mapping between each generated code to a corresponding particular string of the first set of strings.

11. A method, comprising:
  receiving a query term comprising a first set of strings;
  receiving search data comprising a second set of strings;
  identifying a particular set of characters that are included in the first set of strings;
  identifying a compression space based on the particular set of characters included in the first set of strings, wherein identifying the compression space includes determining a quantity of bits to use to represent the particular set of characters included in the first and second sets of strings, the quantity of bits being based on a quantity of unique characters in the first set of strings;
  compressing the first set of strings based on the identified compression space;
  compressing the second set of strings based on the identified compression space;
  comparing the compressed first set of strings to the compressed second set of strings to determine whether the second set of strings includes any strings of the first set of strings; and
  generating a search result, based on the comparing, that indicates instances of the first set of strings that were identified in the second set of strings.

12. The method of claim 10, wherein determining the particular quantity of bits includes performing a logarithm function on the particular quantity of unique characters included in the first set of strings.

13. The method of claim 11, further comprising:
  performing, prior to the compressing of the first and second sets of strings, at least one of:
    a sanitization operation on the first and second sets of strings,
    a correction operation on the first and second sets of strings, or
    a lemmatization operation on the first and second sets of strings.

14. The method of claim 11, wherein compressing the first set of strings includes:
  generating a code that represents each string, in the first set of strings; and
  generating a mapping between each generated code to a corresponding particular string of the first set of strings.

15. The method of claim 11, wherein compressing the second set of strings based on the identified compression space includes:
  identifying a particular string, of the second set of strings, that includes a character that is not in the particular set of characters included in the first set of strings; and
  compressing the identified particular string of the second set of strings to a particular code associated with characters that are not included in the first set of strings.

16. The method of claim 15, wherein the particular code is represented by the quantity of bits determined based on the quantity of unique characters in the first set of strings.

17. The method of claim 15, wherein the particular string is a third string, the method further comprising:
  identifying a fourth string, of the second set of strings, that includes only characters that are in the particular set of characters included in the first set of strings,
  wherein compressing the fourth string includes forgoing using the particular code, associated with characters that are not included in the first set of strings, to compress the fourth string.

18. The device of claim 1, wherein compressing the second set of strings based on the identified compression space includes:
  identifying a particular string, of the second set of strings, that includes a character that is not in the particular set of characters included in the first set of strings; and
  compressing the identified particular string of the second set of strings to a particular code associated with characters that are not included in the first set of strings.

19. The device of claim 18, wherein the particular string is a third string, the method further comprising:
  identifying a fourth string, of the second set of strings, that includes only characters that are in the particular set of characters included in the first set of strings,
  wherein compressing the fourth string includes forgoing using the particular code, associated with characters that are not included in the first set of strings, to compress the fourth string.

20. The non-transitory computer-readable medium of claim 6, wherein compressing the second set of strings based on the identified compression space includes:
- identifying a particular string, of the second set of strings, that includes a character that is not in the particular set of characters included in the first set of strings; and
- compressing the identified particular string of the second set of strings to a particular code associated with characters that are not included in the first set of strings, wherein the particular code is represented by the quantity of bits determined based on the quantity of unique characters in the first set of strings.

* * * * *